(12) United States Patent
Lam

(10) Patent No.: US 6,843,494 B2
(45) Date of Patent: Jan. 18, 2005

(54) REAR SUSPENSION SYSTEM FOR TWO-WHEELED VEHICLES, PARTICULARLY BICYCLES

(75) Inventor: Duhane Lam, Vancouver (CA)

(73) Assignee: Rocky Mountain Bicycles, Annacis Park (CA)

( * ) Notice: Subject to any disclaimer, the term of this patent is extended or adjusted under 35 U.S.C. 154(b) by 0 days.

(21) Appl. No.: 10/222,938

(22) Filed: Aug. 19, 2002

(65) Prior Publication Data

US 2003/0038450 A1 Feb. 27, 2003

Related U.S. Application Data

(60) Provisional application No. 60/313,802, filed on Aug. 22, 2001.

(51) Int. Cl.[7] .............................................. B62K 25/00
(52) U.S. Cl. ..................................................... 280/284
(58) Field of Search ................................ 288/284, 288, 288/285, 286, 275; 180/227

(56) References Cited

U.S. PATENT DOCUMENTS

| | | | |
|---|---|---|---|
| 4,671,525 A | | 6/1987 | Ribi |
| 5,356,165 A | | 10/1994 | Kulhawik et al. |
| 5,452,910 A | | 9/1995 | Harris |
| 5,628,524 A | * | 5/1997 | Klassen et al. .............. 280/284 |
| 5,957,473 A | | 9/1999 | Lawwill |
| 6,102,421 A | * | 8/2000 | Lawwill et al. .............. 280/284 |
| 6,199,886 B1 | | 3/2001 | Guenther |
| 6,293,574 B1 | * | 9/2001 | Storck .......................... 280/284 |
| 6,378,885 B1 | * | 4/2002 | Ellsworth et al. ........... 280/284 |

FOREIGN PATENT DOCUMENTS

| | | |
|---|---|---|
| DE | G 94 16 803.2 U1 | 1/1995 |
| DE | 299 11 373 U1 | 11/1999 |
| EP | 0 827 902 A2 | 3/1998 |
| EP | 1 026 073 A1 | 8/2000 |
| FR | 2 774 966 A1 | 8/1999 |
| FR | 2 776 981 A3 | 10/1999 |
| WO | WO 99/44880 A1 | 9/1999 |

* cited by examiner

Primary Examiner—Lesley D. Morris
Assistant Examiner—Tony Winner
(74) Attorney, Agent, or Firm—Birch, Stewart, Kolasch & Birch, LLP.

(57) ABSTRACT

In a bicycle comprising a frame having at least a bottom bracket, and a rear wheel having a center axis, the improvement including a rear wheel suspension linkage comprising: an upper link member, a lower link member, and a rear stay member; a shock absorber providing compression resistance for said suspension linkage and having first and second ends; said rear stay member having upper and lower ends, and being adapted to have the rear wheel engaged at said lower end; said lower link member having front and rear ends, said rear end of said lower link member being pivotally engaged with said rear stay member at a point between said lower and upper ends, and said front end of said lower link member being pivotally engaged with the frame at a first point vertically spaced from the bottom bracket; said upper link member having a front end, a rear end, and a middle portion, said front end of said upper link member being pivotally engaged with said first end of said shock absorber, said rear end being pivotally engaged with said upper end of said rear stay member, and said middle portion being pivotally engaged with the frame at a second point vertically spaced from said first point; and said second end of said shock absorber being pivotally engaged with the frame.

91 Claims, 13 Drawing Sheets

REAR SUSPENSION SYSTEM FOR TWO-WHEELED VEHICLES, PARTICULARLY BICYCLES

This application claims the benefit of U.S. Provisional Patent Application 60/313,802, filed Aug. 22, 2001.

TECHNICAL FIELD

The present invention relates to two-wheeled vehicles, particularly bicycles, and more specifically, to rear-wheel suspension systems for such vehicles. The present invention, while useful in virtually all manner of two-wheeled vehicles, including motorcycles and scooters, both unpowered and motor powered, shall be described herein primarily in the context of bicycles.

BACKGROUND OF THE INVENTION

A conventional two-wheeled vehicle, such as a bicycle, has a relatively rigid frame which provides only minimal absorption of any forces that are transferred to the frame from irregularities in the surface over which the vehicle is being driven. This is acceptable in those situations where the vehicle is intended for use only on roads or tracks where the degree of irregularity of the surface is fairly limited. However, as the use of two-wheeled vehicles "off-road" has increased over recent years, the conventional, generally rigid rear suspensions have proved to be wholly unsatisfactory for reasons of both comfort and performance.

Suspension systems in general and for bicycles in particular, have two primary functions. They are provided to increase the comfort of the rider (and any passenger) and to increase the performance of the vehicle. Increasing the comfort for the rider can be defined as attenuating vibrations that are induced in the vehicle by irregularities in the ground surface over which the vehicle travels. The greater the amount of these ground induced vibrations that are transmitted through the frame of the vehicle to the rider, the less comfortable the rider will be. Also, the more vibration that is transmitted through to the rider, the greater the amount of effort that will be expended by the rider thereby resulting in fatigue setting in more quickly. Conversely, if the ground effect vibrations can be damped out by the frame of the vehicle, the rider will experience a more comfortable ride and will not tire so easily.

Secondly, suspension systems are provided to increase the vehicle's performance. Performance is closely related to control. The control of a vehicle during acceleration, cornering and braking is largely a function of maintaining a more or less constant contact of the vehicle's tires with the ground, regardless of the terrain over which the vehicle is travelling Thus, the second main purpose of suspension systems is to maintain contact of the vehicle with the ground, i.e., keeping the tires on the ground to provide better control of the vehicle to the rider. In bumpy terrain, unsuspended systems suffer from reduced control because the tires periodically lose contact with the ground. When an unsuspended tire hits a bump, it will tend to "hop" off of the ground momentarily, the extent of the time of noncontact being a function of both the height and configuration of the bump and the speed of the vehicle at the time of its contact with the bump. While in mid-air, the tire can do nothing to assist the rider in maintaining control of the vehicle. Thus, suspension systems serve to reduce ground hop and to maintain contact between the vehicle's tires and the ground.

In order to overcome these difficulties and to provide vehicles that are more adapted to use in environments where greater degrees of ground obstacles are encountered, designers have sought to provide shock absorbing rear wheel suspension systems for those vehicles. Such rear wheel suspensions systems on pedal powered bicycles can provide the rider with the benefits of a more comfortable ride as well as better control of the vehicle. The rear-wheel bicycle suspension system provides a more comfortable ride by absorbing the shocks incurred from encountering ground obstacles, rather than transmitting them through the frame to the rider. Also, by maintaining a greater degree of contact between the rear tire and the ground while travelling over such ground obstacles, the rear wheel suspension system can give the rider better control over the vehicle for accelerating, braking, and cornering.

For a rear-wheel suspension system to be suitable for use on a bicycle, it must be efficient. Ideally, a perfect rear-wheel suspension system would permit the rear wheel of the vehicle to move in reaction to ground forces that are incurred, but would not react similarly to the application of drive-train forces to the rear wheel. Unwanted movement within the suspension system resulting from drive train forces wastes the rider's energy. Bicycle suspension systems can be designed to react to ground forces and not to drive-train forces by careful placement of the real or virtual pivot around which the rear axle rotates.

Several variations of rear wheel suspension systems exist in the prior art. One of these suspension systems comprises attaching the rear wheel's axle directly to a member which pivots around a single main pivot point on the main frame. The pivotable member is then biased downwardly by a spring or shock absorber so as to act to attempt to maintain the rear wheel in contact with the ground. In such a system, the pivot point around which the rear axle rotates is simply the pivot point at which the swing-arm member is attached to the frame. This type of suspension benefits from being simple; however, physical limitations of the bicycle's structure restrict the possible locations of the main pivot on the frame. This limits the designer's ability to vary the rear wheel travel's path to obtain greater efficiency. If the fixed main pivot is placed correctly, this type of suspension system can be reasonably effective, at least for ground surface conditions that are not severe. However, because the possible locations for the main pivot are limited by the frame's geometry and other components such as the front derailleur, optimization of the placement of the main pivot can, for example, interfere with the functioning of the bicycle's front derailleur. As such, the main pivot in this type of suspension system is usually located such that the suspension system provides much less than optimal efficiency.

As has been explained previously, the primary functions of a vehicle's suspension system is to absorb the energy transferred into the vehicle when the vehicle encounters irregularities in the ground's surface and to damp out vibrations of the vehicle frame that are induced by those irregularities. However, suspension systems can also absorb energy from the vehicle's drivetrain. In other words, if a force is exerted through the drivetrain for the purpose of making the vehicle go forward, and that force instead results in a compression of the suspension system, that energy is lost. The ratio of the energy transferred to the vehicle from encountering the irregularities in the ground surface which is absorbed by the vehicle suspension system to the total energy absorbed by the suspension system is termed the "efficiency" of the suspension system. Thus, an efficient suspension system is one which absorbs as much energy from the ground as possible, while absorbing as little energy from the drivetrain as possible. Efficiency is particularly crucial in vehicles, such as bicycles, which have a limited amount of power available. On a bicycle, the more of the rider's energy that can be translated into forward motion rather than into suspension motion, the better. Hence, it is a goal of suspension systems, particularly for bicycles, to be as efficient as possible.

Thus, another type of prior art suspension system which has been proposed for alleviating some of the problems that were present in the single pivot suspension systems is one in which a so-called "four-bar" linkage is used to permit the location of the center of rotation of the axle of the rear wheel to be varied over the path through which that axle travels during the compression of the suspension system. In such a system, two different linkages or two pairs of linkages, are attached at two different locations to the main frame of the bicycle. A third member, to which is attached the rear axle, is pivotally engaged with each of these two linkages. In such a four-bar linkage suspension system, the center of rotation of the rear axle is not fixed, but rather it varies with the positions of the linkages as a function of the position of the rear wheel's axle. As such, in a four-bar linkage type of suspension system, the geometry of the path through which the axle of the rear wheel travels as the suspension system is compressed is defined by the location of the instantaneous center of rotation ("ICR") of the four bar linkage. The ICR, around which the rear axle rotates, is located at the intersection of two lines, each of which extends through each of the two pivot points that are associated with each of the two linkages that are attached to both the main frame of the bicycle and the third member which supports the rear wheel. As the suspension system moves, the ICR changes, unlike the fixed, main pivot suspension systems.

Numerous examples of such prior art four-bar linkage suspension systems exist. One such system is shown in U.S. Pat. No. 6,244,610, which issued on Jun. 12, 2001, to Kramer-Massow. The Kramer-Massow '610 patent discloses a four-bar linkage suspension system in which it appears that an attempt was made to provide the benefits of the isolation of the rider from the shocks produced by the ground surface by using a four-bar linkage, while maintaining the movement of the ICR within a relatively small area such that the path of travel of the rear wheel'axle is substantially circular like that of the fixed pivot suspension systems. This results in a design where the ICR causes an excessive increase in chain length over the vertical travel of the rear wheel's axle. It is a phenomena of many suspension systems in bicycles that, as the suspension system is compressed, the distance between the axis of the chainrings in the bicycle's bottom bracket and the axis of the rear wheel varies, resulting in a change in the length of drive chain between the chainring and the rear derailleur. A excessive growth in chain length results in undesirable pedal feedback.

Pedal feedback is a force that is exerted on the chain when the suspension system compresses. On bicycles with suspension systems that involve an increase in chain length during system compression, the pedals will be caused to rotate backwards when the suspension compresses to make up for the increase in chain length that is required. The rider feels this "pedal feedback" as a tugging force in the drivetrain while attempting to pedal to move the bicycle forward. Pedal feedback, because it is not a pleasant feeling, tends to disturb the pedalling of the rider. As such, it disrupts the smooth flow of energy and power from the rider's feet through the pedals into the drivetrain and the rear wheel. On the other hand, some increase in chain length is beneficial in counteracting the suspension system's tendency to compress when the rider pushes down on the pedals.

Also, in the Kramer-Massow patent, the ICR is located well above the bicycle frame's bottom bracket, a point that is too high considering the short arc radius of the rear wheel's travel path. Such a pivot location results in a path of travel for the rear wheel's axle ("wheelpath") that is initially non-vertical and has a backward component of movement. The backward component of movement along the wheelpath results in a high degree of chain length increase and thereby causes a deleterious amount of pedal feedback.

Similarly, another four-bar linkage suspension system in which the annunciated goal of the design is to provide a rear wheel travel that initially permits the rear wheel to react favorably to the shock of bumps in the terrain being traversed, and to thereafter follow a path that does not vary greatly from an arc centered about the vehicle's crank assembly such that the suspension system does not generate significant chain tension, is shown in U.S. Pat. No. 5,791,674, which issued on Aug. 11, 1998, to D'Aluisio. The D'Aluisio patent is believed to suffer from at least most of the same problems as the Kramer-Massow patent.

A second example of a type of prior art four-bar linkage suspension system is disclosed in U.S. Pat. No. 5,509,679, issued Apr. 23, 1996, U.S. Pat. No. 5,678,837, issued Oct. 21, 1997, and U.S. Pat. No. 5,899,480, issued May 4, 1999, all of which were issued to Leitner. The Leitner patents disclose a four-bar linkage suspension system which comprises a pair of lower links having a front pivot which is near to the bottom bracket of the main bicycle frame and a rear pivot which is located below the center of the rear wheel's axis.

In such a four-bar linkage suspension, the front pivot of the lower link member is usually located such that the chain passes above and below the lower link member, and the rear pivot of the lower link member is located below the axis of the rear wheel. This arrangement limits the possible positions of each of the front and rear pivots severely. As a result, the positioning of the ICR is very limited and cannot be used advantageously to control the wheelpath of the vehicle's rear wheel so to efficiently absorb the energy imparted to the vehicle by the terrain being traversed.

A further example of a such a four-bar linkage in the prior art in which the lower link member is located below the chain is found in U.S. Pat. No. 5,409,249, issued Apr. 25, 1995, and U.S. Pat. No. 5,441,292, issued Aug. 15, 1995, both of which issued to Busby. This design suffers from the same problems as do those disclosed in the Leitner patents.

U.S. Pat. No. 5,553,881, issued Sep. 10, 1996, U.S. Pat. No. 5,628,524, issued May 13, 1997, and U.S. Pat. No. 6,206,397, issued Mar. 27, 2001, to Klassen, disclose another prior art four-bar linkage type of suspension system in which an attempt is made to control the degree of chain length increase, which, according to Klassen, is necessary in order to compensate for pedal feedback. In the Klassen patents, the rear wheel is directed along a predetermined, generally S-shaped path as the suspension is compressed in order to control the degree of chain length change during the compression of the suspension system. This is accomplished by moving the ICR along a path which causes the both the chain length and the rate of change of the chain length to initially increase to a maximum in the middle of the wheelpath and thereafter to decrease over the remainder of the wheelpath. The Klassen patents define that this maximum or peak in the chain's length and rate of chain length growth is critical to the performance of the suspension system.

The Klassen patents teach a design in which a peak is produced in each of two curves that represent movement of the suspension system during its operation: (1) the plot of the chain length versus distance travelled along the rear wheel's path of travel; and (2) the plot of the rate of change of the chain length versus distance travelled along the rear wheel's path of travel. These peaks are achieved by locating the members of the four-bar linkage suspension system in a precise manner such that the movement of one of the linkage members dominates during one portion of the suspension's travel, whereas the opposing linkage member dominates during the remaining portion of the suspension system's movement. As a result of these limitations on the linkages, their precise locations relative to each other greatly restrict the possible location of the ICR's that are achievable with the linkages. As a result, the prior art Klassen designs have less than optimal ICR locations; that is, the ICR locations are too near to the rear of the bicycle. This causes them to provide none of the benefits to the rider that occur as a result of projecting the ICR's forward as is taught by the present invention.

Also, the S-shaped wheelpath of the suspension systems of the Klassen patents results in an inconsistent suspension system behavior which the present inventor believes to be undesirable. For example only, allowing the chain's length to become shorter at any during the travel of the suspension system is very clearly undesirable. A decreasing chainlength provides no benefit in negating the rider's downward thrust on the pedals. To the contrary, such a decrease can only exacerbate the problem. On the other hand, a suspension system with a continuously increasing chainlength is necessary in order for any beneficial negating effect to occur. Furthermore, the S-shaped wheelpath means that the performance of the suspension system is inconsistent throughout the travel of the suspension system. At some points in the suspension system's travel, the rate of chainlength is decreasing, while at other times, it is increasing. This inconsistency is quite undesirable from the rider's point of view. A suspension system which has a constant rate of change of chainlength is far more desirable, whether that rate is constant, increasing or decreasing.

Moreover, in the Klassen patents, the rear pivot of the lower link is located very close to the rear wheel's axis. The suspension system employs a dual eccentric pedal crank mechanism which is mounted adjacent to and just below the bicycle's bottom bracket. This mechanism creates the preferred S-shaped wheelpath of the rear wheel's axis. This acts to provide a chain lengthening effect in an attempt to counteract any suspension compression that is caused by the downward forces arising from the weight of the rider and from the pedalling forces. However, as the rear wheel's axis travels along the wheelpath, there is an increasing chain lengthening effect in the lower part of the wheelpath below an inflection point, and a decreasing chain lengthening effect through the upper part of the wheelpath. Additionally, the dual eccentric pedal crank mechanism adds considerable complexity to the bicycle, thereby significantly increasing the chance of reliability and maintenance problems, particularly in view of the terrain over which such bicycles are frequently ridden.

Another example of a prior art four-bar linkage suspension system is that which was shown in an advertisement for the Bianchi Super G mountain bike that appeared in *Mountain Bike* magazine, April 1996, at page 95. The Bianchi Super G bicycle incorporated a four-bar linkage in which, when in its at rest condition, the two opposing linkage members were each relatively short and generally parallel to each other with the lower linkage member being shorter than the upper member. Thus, this linkage caused the ICR to move radically, starting far out in front of the bicycle, initially moving forward to essentially infinity, and then switching rapidly to points which are far behind the bicycle. This radical movement of the ICR resulted in a wheelpath of the rear wheel's axle that was very curved due to the large changes in ICR location thereby causing a chain length increase that is initially very rapid, thereafter falling off rapidly, and even going negative at high degrees of compression of the suspension system. Such a highly curved wheelpath, with the large changes in ICR, and the rate of chain length increase and decrease resulted in a highly inefficient suspension system.

A still further example of a four-bar linkage in the prior art is found in U.S. Pat. No. 5,4352.910, issued Sep. 26, 1995, to Harris. The linkage shown and disclosed in the Harris patent is wholly different from all of those discussed so far in that the bottom bracket of the bicycle, i.e., the portion of bicycle which carries and supports the pedal cranks, is mounted on the swing arm of the four-bar linkage. As such, there is never any change in chain length. However, because the axis about which the pedals rotate is moving at all times during use of the bicycle, this design will be very disconcerting and tiring for the rider. Also, this design does not provide sufficient isolation of the rider from the shocks and vibration caused by irregularities in the terrain.

Finally, a recently issued patent to Ellsworth, U.S. Pat. No. 6,378,885, issued Apr. 30, 2002, discloses a bicycle suspension system utilizing a four-bar linkage which attempts to locate and maintain the instantaneous center of rotation of the bicycle's rear wheel as close as possible to a line that is defined by the tension side of the chain drive of the bicycle. The Ellsworth patent also attempts to maintain the instantaneous center of gravity well in front of the bicycle's bottom bracket in order to prevent "squatting" of the suspension system. In doing so, the Ellsworth patent utilizes upper and lower rocker arms that are of similar effective length and which are mounted at their rear ends to seat stay members that are nearly vertical in their attitude. Also, the lower rocker arm is located close to the rear wheel's axle at its rear end and adjacent to the bottom bracket at the front end. This arrangement enables the structure of the Ellsworth patent to have a locus of its instantaneous centers of rotation that does not move significantly, either vertically or horizontally, although, by necessity, the instantaneous centers of rotation do become somewhat lower as the suspension system is compressed. It is further noted that the Ellsworth patent attempts to have as little growth of chain length as is possible over the full range of compression. While it is clear that the Ellsworth patent is attempting to reach certain of the same goals as does the present invention (as is also the case with at least most of the aforementioned prior art), as will be seen from the following description, the principles and techniques used to accomplish these goals are quite different.

An additional disadvantage of many of the above suspension systems is the possibility of "chain suck" occurring. This occurs when the bicycle's chain gets caught between a gear chainring and a link of the suspension system and usually occurs when one of the link members is near or below the level of the driven length of the chain.

SUMMARY OF THE INVENTION

It is, therefore, a primary object of the present invention to provide an improved rear-wheel suspension system for two-wheeled vehicles, particularly bicycles.

It is another object of the present invention to provide an improved suspension system in which a multiple member linkage is attached to the vehicle's frame at two separated pivotable locations.

It is another object of the present invention to provide an improved rear-wheel suspension system that utilizes a multiplicity of links to effectively isolate the vehicle's rider from shocks and vibrations that are introduced into the vehicle through the vehicle's rear wheel, wherein in certain preferred embodiments the multiple member linkage is of the four-bar linkage type.

It is another object of the present invention to provide a rear-wheel suspension system in which the linkage assembly that carries the rear wheel permits that rear wheel to move along a wheelpath during the compression of the suspension system which is generally vertical and which causes the distance between the bottom bracket of the vehicle and the rear wheel's axle to increase continuously as the rear path moves upwardly, relative to the frame, over the wheelpath.

It is still another object of the present invention to provide a rear-wheel suspension system which provides a locus of ICR's for the axle of the rear wheel, thereby allowing a significantly improved efficiency of the suspension system.

It is a further object of the present invention to provide a suspension system that acts to cause energy imparted to the suspension system by irregularities in the ground surface to be translated into forces tending to move the vehicle forward.

It is a still further object of the present invention to provide a rear suspension system which prevents the bicycle's chain from being caught between a frame member and the bicycle's chainring.

Therefore, in accordance with the broader aspects of the present invention and solving the foregoing problems, there is provided a rear wheel suspension system for a chain-driven two-wheeled vehicle having a frame with a bottom bracket and a rear wheel. The suspension system includes a multiple member linkage assembly which is pivotally attached to the frame at two separated locations. The linkage assembly includes a rear stay member and a lower linkage member. The rear stay member, at its lower end, supports the rear wheel of the vehicle at its axle in a manner such that the rear wheel is able to move generally vertically with its axle moving from a lowermost position upward along a generally vertical wheelpath. The movement of the rear wheel's axle is such that the distance between the bottom bracket and the rear wheel's axle increases continuously as the rear wheel's axle is caused to move upwardly from its lowermost position along the wheelpath. Also, the movement of the rear wheel's axle is such that the rate of the change of distance between the bottom bracket and the rear wheel's axle either remains essentially constant or changes continuously in only a single sense over the movement of the rear wheel's axle upwardly from its lowermost position along the wheelpath. The lower linkage member is pivotally connected to the frame at one of the two locations and is also pivotally connected at its rearmost end to an intermediately located point on the rear stay member at a location which is above the axle of the rear wheel when the rear wheel is in its lowermost position relative to the frame. Finally, the suspension system includes a shock absorbing and damping device affixed between a member of the linkage assembly and either the frame of another member of the linkage assembly to cause the rear wheel to maintain as continuous a contact as possible with a surface over which the vehicle is ridden despite the presence of irregularities in the surface.

According to another aspect of the present invention, a rear wheel suspension system for a bicycle has a frame having a bottom bracket, and a rear wheel which rotates about a rear wheel axle at a distance from the bottom bracket. This suspension system comprises a multiple member linkage assembly which is pivotally attached to the frame at two separated locations. The linkage assembly includes a rear stay member and a lower linkage member. The rear stay member, at its lower end, supports the rear wheel of the bicycle at its axle in a manner such that the rear wheel is able to move generally vertically with its axle moving from a lowermost position upward along a generally vertical wheelpath that has, at all locations therealong, an instantaneous center of rotation. The instantaneous centers of rotation lie along a line which commences, when the rear wheel of the bicycle is at its lowermost position relative to the frame, forward of the bottom bracket and which moves, as the rear wheel moves generally vertically, continuously rearwardly. As such, the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle either remains essentially constant or changes continuously in only a single sense over the movement of the rear wheel's axle upwardly from its lowermost position along the wheelpath. The lower linkage member is pivotally connected to the frame at one of the locations and is pivotally connected rearwardly thereof to an intermediately located point on the rear stay member, which point is above the axle of the rear wheel when the rear wheel is in its lowermost position relative to the frame. Finally, a shock absorbing and damping device is affixed between a member of the linkage assembly and either the frame or another member of the linkage assembly to cause the rear wheel to maintain as continuous a contact as possible with a surface over which the bicycle is ridden despite the presence of irregularities in the surface.

In accordance with another aspect of the invention, a rear wheel suspension system for a bicycle is disclosed which has a frame having a bottom bracket, and a rear wheel which rotates about a rear wheel axle at a distance from the bottom bracket. The suspension system includes a multiple member linkage assembly which is pivotally attached to the frame at two separated locations. Both of the locations are spaced above the bottom bracket. The linkage assembly includes a pair of rear stay members and a pair of lower linkage members, a respective one of each of the pairs being disposed on opposite sides of the rear wheel. The rear stay members, at their lower ends, supports the rear wheel of the bicycle at its axle in a manner such that the rear wheel is able to move generally vertically with its axle moving from a lowermost position upward along a generally vertical wheelpath. As such, the distance between the bottom bracket and the rear wheel's axle increases continuously as the rear wheel's axle is caused to move upwardly from its lowermost position along the wheelpath. Also, the rate of the change of distance between the bottom bracket and the rear wheel's axle either remains essentially constant or changes continuously in only a single sense over the movement of the rear wheel's axle upwardly from its lowermost position along the wheelpath. Each of the lower linkage members is pivotally connected to the frame at one of said locations and is pivotally connected rearwardly thereof to an intermediately located point on the respective rear stay member, which point is above the axle of the rear wheel when the rear wheel is in its lowermost position relative to the frame. A shock absorbing and damping device is affixed between a member of the linkage assembly and either the frame or another member of the linkage assembly to cause the rear wheel to maintain as continuous a contact as possible with a surface over which the bicycle is ridden despite the presence of irregularities in the surface.

According to a further aspect of the invention, a rear wheel suspension system is provided for a bicycle having a frame with a bottom bracket, and a rear wheel which rotates about a rear wheel axle at a distance from the bottom bracket. The suspension system comprising a four-bar linkage assembly which is pivotally attached to the frame at two vertically separated locations. The lower one of the vertically separated locations is vertically spaced above the bottom bracket. The linkage assembly includes a pair of rear stay members and a pair of lower linkage members. A respective one of each of the pairs is disposed on opposite sides of the rear wheel. The rear stay members, at their lower ends, supports the rear wheel of the bicycle at its axle in a manner such that the rear wheel is able to move generally vertically with its axle moving from a lowermost position upward along a generally vertical wheelpath. The wheelpath has, at all locations therealong, an instantaneous center of rotation, which instantaneous centers of rotation lie along a line which commences, when the rear wheel of the bicycle is at its lowermost position relative to the frame, forward of the bottom bracket. The line then moves, as the rear wheel moves generally vertically, continuously rearwardly, such that the distance between the bottom bracket and the rear wheel's axle increases continuously as the rear wheel's axle is caused to move upwardly from its lowermost position along the wheelpath. As such, the rate of the change of distance between the bottom bracket and the rear wheel's axle decreases continuously over the movement of the rear wheel's axle upwardly from its lowermost position along the wheelpath. The lower linkage member is pivotally connected to the frame at one of said locations and is pivotally connected rearwardly thereof to an intermediately located point on the rear stay member which is above the axle of the rear wheel when the rear wheel is in its lowermost position relative to the frame. Then, a shock absorbing and damping device is affixed between a member of the linkage assembly and either the frame or another member of the linkage assembly to cause the rear wheel to maintain as continuous a contact as possible with a surface over which the bicycle is ridden despite the presence of irregularities in the surface.

In accordance with a still further aspect of the present invention, a rear wheel suspension system for a bicycle is provided which has a frame having a bottom bracket, and a rear wheel which rotates about a rear wheel axle at a distance from the bottom bracket. The suspension system comprises a four-bar linkage assembly which is pivotally attached to the frame at two vertically separated locations, the lower one of which is vertically spaced above the bottom bracket. The linkage assembly includes a pair of rear stay members, a pair of lower linkage members, and a pair of upper linkage members, a respective one of each of the pairs of members being disposed on opposite sides of the rear wheel. The rear stay members, at their lower ends, supports the rear wheel of the bicycle at its axle in a manner such that the rear wheel is able to move generally vertically with its axle moving from a lowermost position upward along a generally vertical wheelpath. The wheelpath has, at all locations therealong, an instantaneous center of rotation, which instantaneous centers of rotation lie along a line which commences, when the rear wheel of the bicycle is at its lowermost position relative to the frame, forward of the bottom bracket and which moves, as the rear wheel moves generally vertically, continuously rearwardly,. As such, the distance between the bottom bracket and the rear wheel's axle increases continuously as the rear wheel's axle is caused to move upwardly from its lowermost position along the wheelpath. Also, the rate of the change of distance between the bottom bracket and the rear wheel's axle increases continuously over the movement of the rear wheel's axle upwardly from its lowermost position along the wheelpath. The lower linkage member is pivotally connected to the frame at one of said locations and is pivotally connected rearwardly thereof to an intermediately located point on the respective one of the rear stay members which is above the axle of the rear wheel when the rear wheel is in its lowermost position relative to the frame. Each of the upper linkage members is pivotally connected to the frame at the other of said locations and is pivotally connected to the respective one of the rear stay members at a point which is spaced vertically above the pivotal connection of the lower linkage members to the respective rear stay members. A shock absorbing and damping device is affixed between a member of the four-bar linkage assembly and either the frame or another member of the linkage assembly to cause the rear wheel to maintain as continuous a contact as possible with a surface over which the bicycle is ridden despite the presence of irregularities in the surface.

According to a still further aspect of the present invention, a rear wheel suspension system is provided for a bicycle having a frame with a bottom bracket, and a rear wheel which rotates about a rear wheel axle at a distance from the bottom bracket. The suspension system includes a four-bar linkage assembly which is pivotally attached to the frame at two vertically separated locations. The lower one of the locations is vertically spaced above the bottom bracket. The linkage assembly includes a pair of rear stay members, a pair of lower linkage members, and a pair of upper linkage members. A respective one of each pair said of members is disposed on opposite sides of the rear wheel. The rear stay members, at their lower ends, support the rear wheel of the vehicle at its axle in a manner such that the rear wheel is able to move generally vertically with its axle moving from a lowermost position upward along a generally vertical wheelpath. That wheelpath has, at all locations therealong, an instantaneous center of rotation, which instantaneous centers of rotation lie along a line which commences, when the rear wheel of the bicycle is at its lowermost position relative to the frame, forward of the bottom bracket. The line then moves, as the rear wheel moves generally vertically, continuously rearwardly, such that the distance between the bottom bracket and the rear wheel's axle increases continuously as the rear wheel's axle is caused to move upwardly from its lowermost position along the wheelpath. As such, that the rate of the change of distance between the bottom bracket and the rear wheel's axle increases continuously over the movement of the rear wheel's axle upwardly from its lowermost position along the wheelpath. The lower linkage member is pivotally connected to the frame at one of said locations and is pivotally connected rearwardly thereof to an intermediately located point on the respective one of the rear stay members which is above the axle of the rear wheel when the rear wheel is in its lowermost position relative to the frame. Each of the upper linkage members is pivotally connected to the frame at the other of said locations and is pivotally connected to the respective one of the rear stay members at a point which is spaced vertically above the pivotal connection of the lower linkage members to the respective rear stay members. A shock absorbing and damping device is affixed between two members of the four-bar linkage assembly to cause the rear wheel to maintain as continuous a contact as possible with a surface over which the bicycle is ridden despite the presence of irregularities in the surface.

According to a final aspect of the invention, a rear wheel suspension system is provided for a bicycle having a frame with a bottom bracket, and a rear wheel which rotates about a rear wheel axle at a distance from the bottom bracket. The suspension system includes a multiple member linkage assembly which is pivotally attached to the frame at two vertically separated locations, the lower one of which is vertically spaced above the bottom bracket. The linkage assembly includes a pair of rear stay members and a pair of lower linkage members. The pair of rear stay members, at their lower ends, supports the rear wheel of the vehicle at its axle in a manner such that the rear wheel is able to move generally vertically with its axle moving from a lowermost position upward along a generally vertical wheelpath. As such, the distance between the bottom bracket and the rear wheel's axle increases continuously as the rear wheel's axle is caused to move upwardly from its lowermost position along the wheelpath. Also, the rate of the change of distance between the bottom bracket and the rear wheel's axle either remains essentially constant or changes continuously in only a single sense over the movement of the rear wheel's axle upwardly from its lowermost position along the wheelpath. The lower linkage member is pivotally connected to the frame at one of said locations and is pivotally connected rearwardly thereof to an intermediately located point on the rear stay member which is above the axle of the rear wheel when the rear wheel is in its lowermost position relative to the frame. A shock absorbing and damping device is affixed rigidly at one end thereof to the pair of rear stay members above the connections of the pair of lower linkage members to the respective ones of the pair of rear stay members. The other end of the shock absorbing and damping device is pivotally affixed to the other location on the frame to cause the rear wheel to maintain as continuous a contact as possible with a surface over which the bicycle is ridden despite the presence of irregularities in the surface.

BRIEF DESCRIPTION OF THE DRAWING

Further features and advantages of the present invention will become apparent to persons of ordinary skill in the art from the following detailed description of the invention, taken in combination with the appended drawing, in which.

DETAILED DESCRIPTION OF THE PREFERRED EMBODIMENTS

Figure 1:
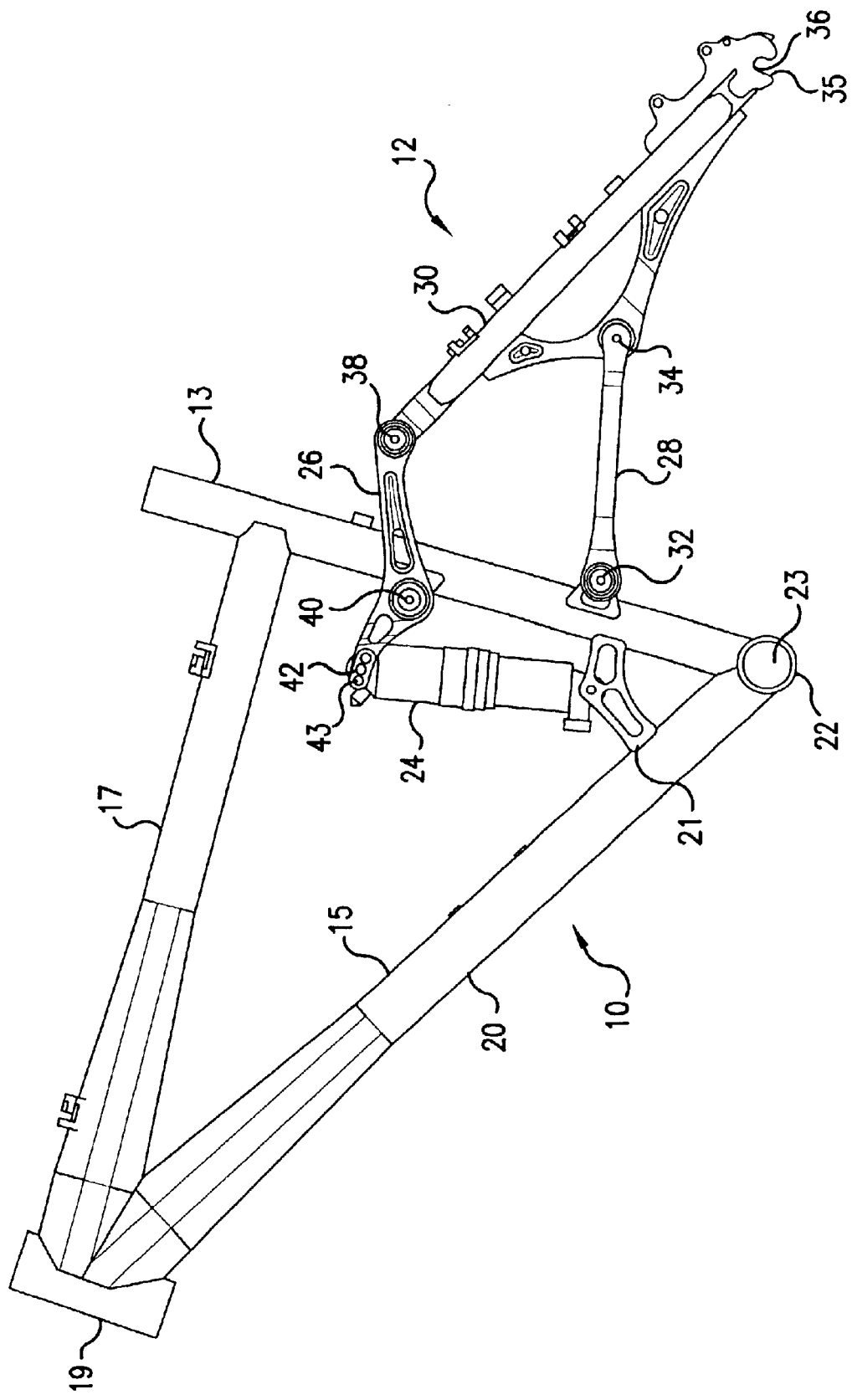
FIG. 1 is a side elevation view of a first embodiment of a rear suspension system according to the present invention, shown in its operational relationship with a bicycle frame, the suspension system being shown in its fully extended position.

In referencing and discussing the aforementioned figures of the drawing and the various embodiments of the invention that are disclosed herein, like reference numerals will be used to refer to like elements of those embodiments.

Figure 2:
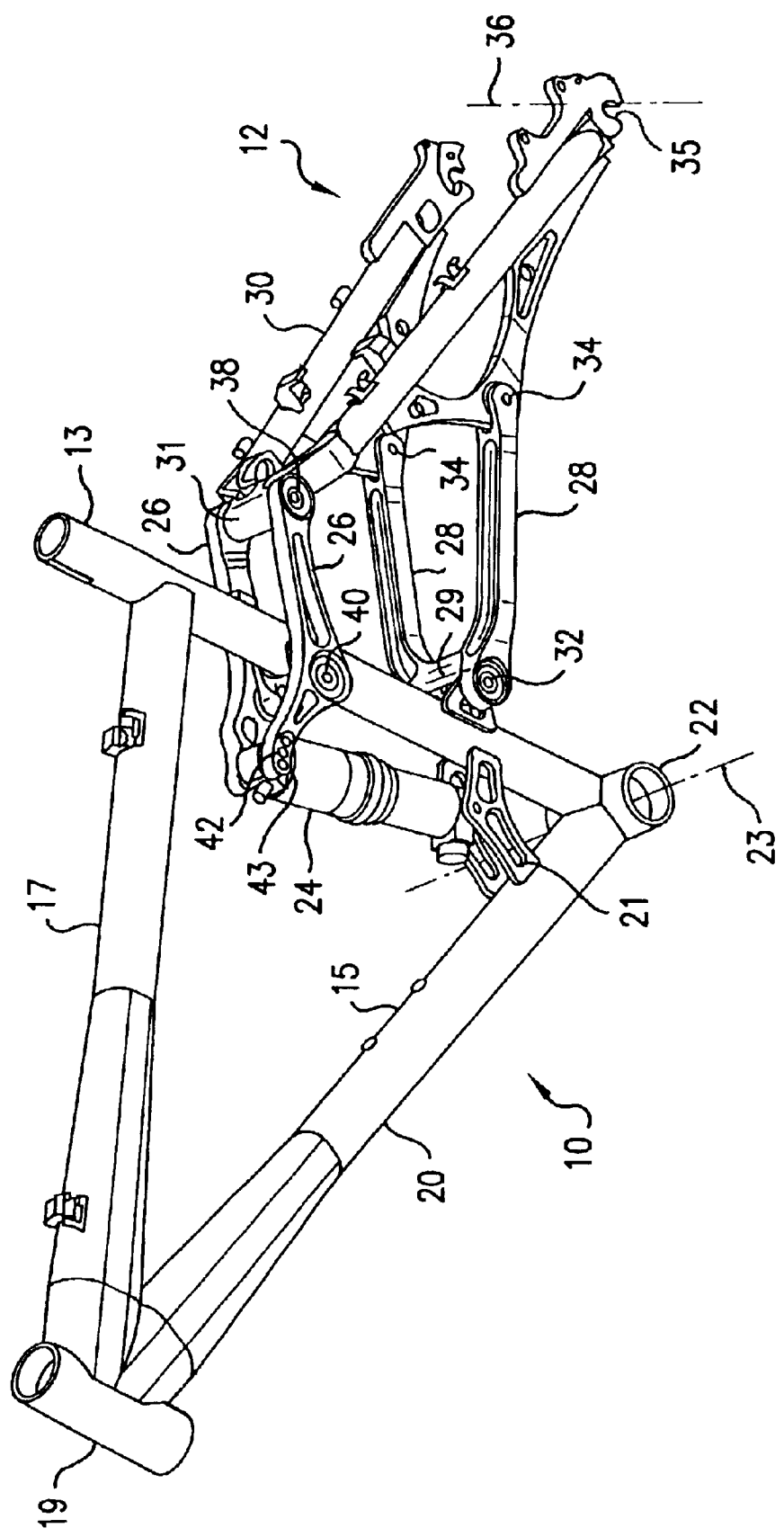
FIG. 2 is a perspective view of the embodiment of the suspension system shown in FIG. 1.
Figure 3:
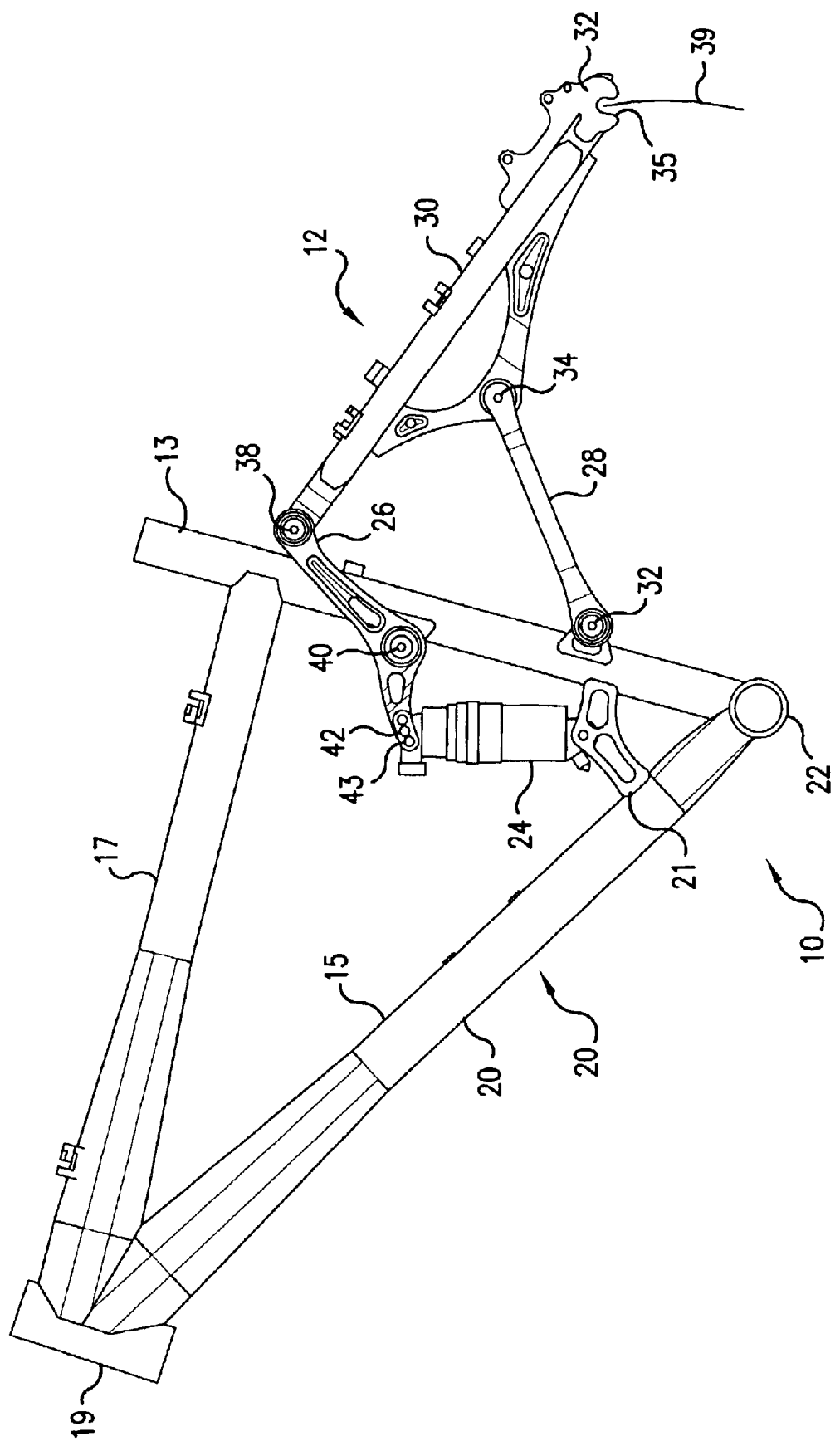
FIG. 3 is a side elevation view of the first embodiment of the rear suspension system shown in FIG. 1, according to the present invention, which suspension system is shown in its fully compressed position, and showing the wheelpath travelled by the rear wheel's axle.

A first preferred embodiment of a two-wheeled vehicle's rear suspension system according to the present invention is shown in FIG. 1, FIG. 2, and FIG. 3. In those figures, a bicycle frame assembly is indicated generally at 10 and comprises a main frame 20 and a rear suspension system linkage assembly 12. In this preferred embodiment, the main frame 20 can typically be manufactured out of aluminum, steel, carbon-fibre, or other materials that are known to persons of ordinary skill in this art. A sample of the preferred embodiment of this invention was manufactured from 7005 Aluminum alloy tubing.

The main frame 20 comprises a seat tube 13, a down tube 15, a top tube 17, a head tube 19, and a bottom bracket 22. The bottom bracket 22 defines a crank axis 23 therethrough, about which the bicycle's pedal cranks rotate. The seat tube 13 can either be full length, rigidly connecting the bottom bracket 22 and the top tube 17, or can be of a partial length, rigidly suspended only from the top tube, for example. The main frame can also equally be a single large structure rather than composed of the aforementioned assembly of distinct tubes, such as a monocoque-type frame section which can be made of carbon fibre or sheet metal.

A springing and damping mechanism, or shock absorbing member, such as a shock absorber 24, is pivotally attached to the main frame 20, by a lower shock mounting bracket 21. The lower shock mounting bracket 21 is secured within the main frame between the seat tube 13 and the down tube 15, such as by welding or brazing. The shock absorber 24 provides a compression resistance force against which the rear suspension system linkage assembly 12 operates. While this preferred embodiment shows the shock absorber 24 as being pivotally attached within the main frame 20 between the seat tube 13 and the down tube 15, the shock absorber 24 can be mounted with equal effect elsewhere within the main frame 20 by attaching it to one or more of the other tubes, or outside the main frame, such as between an upper link member and the seat tube, for example. Additional variations of shock absorber mounting are also possible as will be exemplified in and discussed in greater detail with respect to the other disclosed embodiments of this invention.

In the first embodiment of the present invention, the rear suspension system linkage assembly 12 is comprised generally of two sets of members, each of which is a mirror image of the other, a set of such members being located to each side of the vehicle's rear wheel, as is indicated generally in FIG. 2. Although it is preferred in the present invention to utilize such a symmetrical system of members because such an arrangement tends to balance the application of forces within the vehicle's structure, it is within the overall purview of the present invention that a rear suspension system can be produced in which the members are asymmetrical. It is also possible that only a single set of such members is used, which members are to be found on a single side of the rear wheel. Hence, in the following discussions of the various embodiments of the present invention, it should be understood that both single and double sided versions, as well as asymmetrical versions, of the structures are contemplated as being within the invention.

The linkage assembly 12 includes a pair of upper link members 26, a pair of lower link members 28, and a pair of rear stay members 30. The rear wheel of the bicycle is mounted between the pair of rear stay members 30 at the dropouts 35 at the lower ends thereof. Hence, the rear wheel's axle, and, therefore, the rear wheel's central axis 36, is located within the dropouts 35. The rearmost ends of the lower link members 28 are pivotally connected to the rear stay members 30 at a rear pivot point 34 which is located intermediate of the ends of the rear stay members 30, such that the rear pivot 34 is located above the rear wheel's axis 36. The lower link members 28 are also pivotally connected at their respective front ends to the seat tube 13 of the main frame 20 at a front pivot point 32, which pivot point is preferably located significantly above the crank axis 23. The effective length of the lower link member 28, that is the distance between the pivot points 32 and 34 is considerably greater than is the effective length of the upper link member 26, that is the distance between the pivot points 38 and 40.

Similarly, the rearmost ends of the upper link members 26 are pivotally connected to the top of the rear stay members at an upper pivot point 38. The upper link members 26 are further pivotally connected, at a point 40 which is located intermediate of their ends, to the seat tube 13 of the main frame 20. The pivot point 40 is substantially higher on the main frame 20 than is the front pivot point 32 of the lower link members 28. Additionally, in this embodiment, the frontmost ends of the upper link members 26 are pivotally connected to the top of the shock absorber 24 at a shock pivot point 42.

Thus, because the shock absorber 24 is connected between the main frame 20 and the rear suspension system linkage assembly 12, the shock absorber 24 acts to counter any forces that may be applied to the rear suspension linkage assembly 12 by the rear wheel so as to tend to maintain the relative positions of the main frame 20 and the rear suspension linkage assembly 12 constant. Doing so thereby also tends to attempt to keep the rear wheel in substantially continuous contact with the ground thereby affording the rider greater control of the vehicle than would occur if the rear wheel is permitted to leave contact with the ground for significant periods of time. Having the rear wheel out of ground contact results in a significant decrease in the rider's ability to exert control over the vehicle. By doing so, the shock absorber 24 absorbs much of the energy which enters the vehicle through the rear wheel rather than having that energy transferred through the main frame 20 to the rider. As a result the rider experiences a more comfortable ride and is able to maintain better control over the vehicle. This is of particular significance when the vehicle is operated over highly uneven terrain such as takes place in the operation of mountain bicycles.

As is best seen in FIG. 2, in this preferred embodiment, each of the members which comprises the rear suspension linkage assembly 12 is formed preferably so as to be joined by a yoke to its counterpart member. As such, any potential that might otherwise occur for the counterpart members to twist vis-a-vis each other is thereby reduced significantly. More specifically, the left and right rear stay members 30 are preferably joined to each other by a yoke 31 at their upper ends. The yoke 31 thus forms a horizontally extending tubular member, which, in this embodiment, houses the upper pivot connection 38 between the rear stay members 30 and the upper link members 26. Similarly, the two lower link members 28 are joined by a yoke 29 adjacent to the front pivot point 32 which connects the lower link members 28 to the main frame 20.

In this preferred embodiment, a means is provided for permitting the rider to be able to adjust the rear suspension system in order to allow for variations in the terrain over which the vehicle is being operated. In other words, when the terrain is relatively smooth, the suspension system can be adjusted to restrict the length of the rear wheel's wheelpath so that the bicycle tends to ride more smoothly. Similarly, when the terrain is rougher, the rear suspension system can be adjusted to allow the rear wheel's axle to travel along the entire wheelpath in order to provide the rider with as comfortable a ride as possible throughout the travel of the rear wheel's axle. In addition, one or more intermediate positions can be incorporated into the design thereby providing the ability to compensate for less than the total travel possibilities along the length of the wheelpath, while simultaneously allowing the vehicle to ride as smoothly as possible.

In the embodiment shown in FIGS. 1–3, this adjustment is accomplished by undoing a bolt that is located at and which forms the shock absorber pivot point 42. The bolt can be passed through any of three different holes 43 that are found in each of the front ends of the upper link members 26. In between the forward ends of the upper link members 26 is the top of the shock absorber 24 and the shock absorber pivot bolt also serves to attach the shock absorber 24 pivotally to the upper link members 26. While a blot and mating hole configuration of this means is shown here, it is to be understood that numerous other devices could be substituted equivalently by persons of ordinary skill in this art, including but not limited to operating a removable locking or quick release pin, a crank controlling a rack and pinion arrangement, a spring biased detent pin and track, and the incorporation of complimentary locking surfaces on the bolt and upper link members combined with a continuous slot whereby the tightening of the bolt causes the surfaces to bind against each other. In this regard, it should be noted that the rack and pinion arrangement and the use of a continuous slot allow the rider to have virtually infinite freedom to adjust the length of wheelpath within the defined limits at the ends of the wheelpath. In this preferred embodiment, the attachment point farthest away from the pivot 40 on the seat tube 13 permits approximately 3.5 inches of rear wheelpath travel, the center attachment point permits approximately 4 inches of travel and the attachment point closest to the pivot 40 permits approximately 4.5 inches of rear wheelpath travel.

In the preferred embodiment, the distance between the front pivot point 32 and the rear pivot point 34 of the lower link members 28, is greater than the distance between the main pivot point 40 and the upper pivot point 38 of the upper link members 26. The rear pivot point 34 is located slightly lower than the front pivot point 32, such that the lower link members 28 incline slightly towards the front of the bicycle when the suspension is in the fully extended position as is shown in FIG. 1. The main pivot axis 40 is located slightly below the upper pivot point 38, so that the upper link members 26 decline slightly towards the front of the bicycle when the suspension is fully extended as is shown in FIG. 1.

The instantaneous center of rotation of the bottom of the rear stay member 30, and therefore the rear wheel axis 36, at any given position of the upper and lower link members is located at the intersection of two lines, each of which extends through both of the pivot points that are associated with one of the link members. This creates instantaneous centers of rotation (ICR's) of the rear wheel's axis that are both forward of and above the crank axis 23, and which get progressively lower as the suspension compresses. The instantaneous centers of rotation of the rear wheel's axis 36 are located slightly above the rear wheel axis 36 when the rear suspension is compressed by approximately 20% of its full travel.

The travel path 39 of the rear wheel's axis 36, shown in FIG. 3, which results from the instantaneous centers of rotation created by the suspension geometry of the present invention, allows for an ideal chain growth. Chain growth, or chain length increase, is an increase in the distance between the crank axis 23 and the rear wheel's axis 36 during the compression of the suspension. A chain length that decreases at any time as the suspension system compresses is undesirable because tension applied to the chain by pedalling would tend to cause the suspension system to compress, thereby wasting the rider's energy. As such, a certain amount of chain growth is necessary to counteract the natural tendency of the suspension system to compress with the downward forces from pedal strokes. As is visible in FIG. 3, there is some degree of chaingrowth throughout the entire range of the travel path or wheelpath 39 of the rear wheel's axis 36. However, too much chaingrowth can also be undesirable. In a preferred embodiment of the present invention, the ratio of chaingrowth to rear wheel travel is generally between 9 and 27 percent for best results. Therefore, for a suspension with 100 mm of rear wheel travel, the overall chaingrowth should be less than about 30 millimeters and preferably should be at least 9 mm, but less than 27 mm for optimum results.

The length of the link members and the locations of the pivot points, which define this suspension geometry, allow for the provision of a rear wheel suspension assembly that is more efficient than any of the prior art systems. Therefore, the pedalling power efficiency is not sacrificed for rear wheel travel, such that the suspension reacts largely to ground forces only and suspension activation is minimized even while the rider is pedalling hard.

Figure 4:
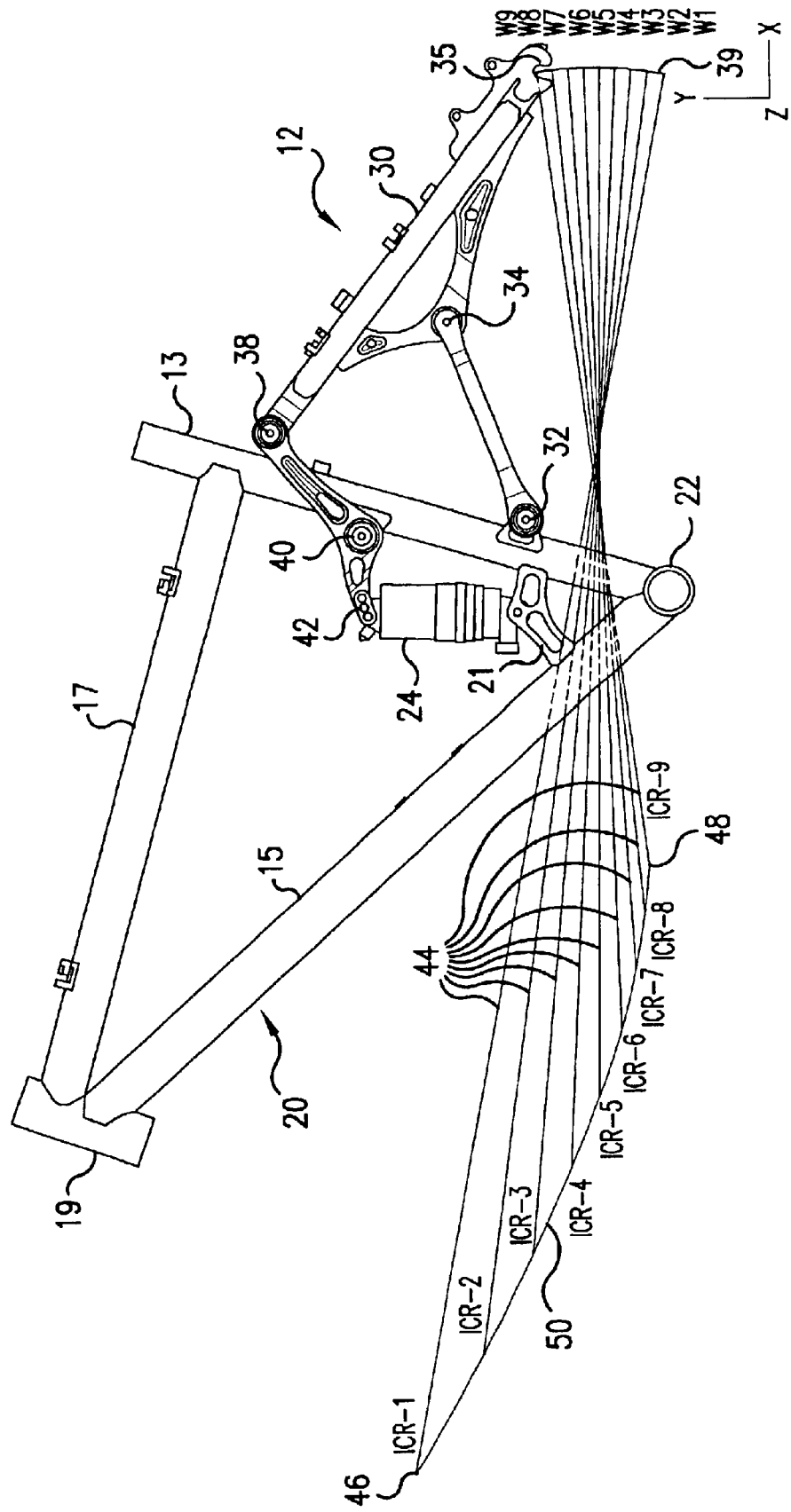
FIG. 4 is a diagrammatic showing of the location of the ICR's of the embodiment of the suspension system of FIG. 1 for the wheelpath travelled by the rear wheel's axle during the compression of the suspension system.

Referring now to FIG. 4, which shows the suspension system as shown in FIG. 3, that is in its fully compressed state, with a diagrammatic showing of the instantaneous centers of rotation, along with their respective radii 44, for a series of locations along the wheelpath of the rear wheel's axis 36. As is indicated, when the suspension system is in its fully extended position, that is, the position where the suspension system is located when no loads are being applied to the system, the initial ICR 46 is located well forward of the frame assembly 20 and well above the bottom bracket 22. It is, however, within the overall purview of the present invention that the initial ICR's for a given embodiment can be located at numerous locations relative to the frame of the vehicle, so long as the ICR's are such that the chain length continuously increases over the entire length of the wheelpath In general, however, the initial ICR will be well above the bottom bracket. Then, as the frame is compressed and the rear wheel's axle travels upwardly along the wheelpath, the ICR's will be located progressively lower, but still above the bottom bracket. As the suspension system is compressed, the radii 44 also become increasingly shorter as the ICR's become lower, with the ICR reaching its lowest point 48 when the suspension system is fully compressed. This relationship is illustrated by the curve 50 which represents the locus of the ICR's throughout the length of the rear wheel's travel along the wheelpath. It should be noted that this relationship remains regardless of where the means for adjusting the length of the wheelpath is set since that action will merely truncate the length that the system will permit the rear wheel's axle to travel along the wheelpath.

Figure 5:
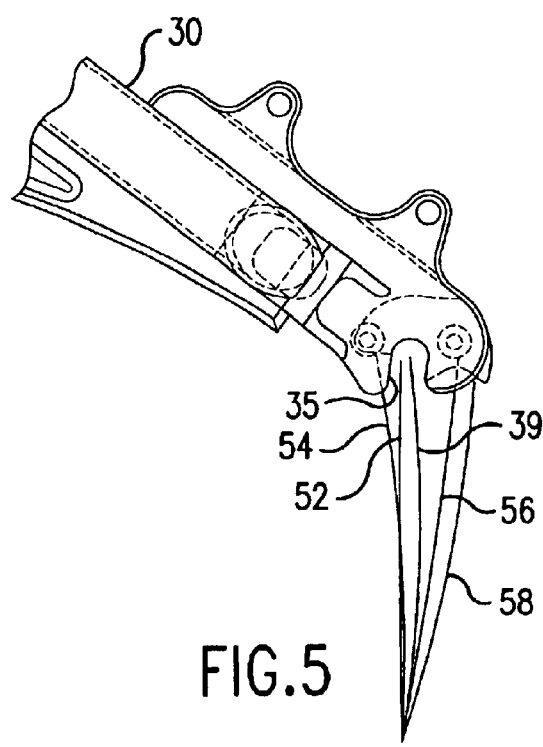
FIG. 5 is an enlarged diagrammatic view of the lower end of the rear stay members with a number of potential wheelpath curves shown to demonstrate the effects of the present invention.

In FIG. 5, there is shown an enlarged view of the lower end of the rear stay member 30, with the dropout 35 in the lower end thereof. Also shown are a series of actual and hypothetical wheelpaths to demonstrate the foregoing relationships result in the desirable wheelpath of the present invention. The wheelpaths, for the sake of comparison, are assumed to have a common point in their fully extended position, that is, at the lower end of the wheelpath when no forces are being applied to the suspension system, and to permit a wheelpath length of travel of 4.5 inches, as is the case with the embodiment of the present invention. The middle one of the wheelpaths shown, to which is assigned the reference numeral 39, is the wheelpath through which the suspension system of the first embodiment of the present invention passes. To its left, there is shown a hypothetical wheelpath 52 which is vertical throughout its entire length. This purely vertical hypothetical wheelpath is the theoretically perfect wheelpath in that it provides a constantly increasing chain length throughout its length, but yet constantly maintains the wheelpath perpendicular to the ground surface. However, such a wheelpath is not achievable with the types of mechanisms that are usable on a bicycle or other two-wheeled vehicle. Hence, the intent of the present invention is to generate a wheelpath that is as close to a vertical line as is reasonably possible consistent with economic, technological and manufacturing capabilities The leftmost curve 54 represents the wheelpath of a prior art bicycle suspension system which utilized a fixed pivot point for the swingarm on which the rear wheel was mounted. As such, curve 54 has a common radius throughout its length which corresponds to the length of the swingarm and there is very little change in chain length over the length of the wheelpath since the swing arm is mounted, at its front end, closely adjacent to the bicycle's bottom bracket.

Similarly, the curve 56, which is immediately to the right of the wheelpath 39, represents the wheelpath that would be generated if the center of rotation were maintained constant at its initial location 46 (see FIG. 4). Obviously, this curve also has only a single radius. Here, there would be a significant change in chain length since the point 46 is located well away from the bottom bracket. However, as is apparent from the curve, the increase in chain length is substantial preventing this from being a viable alternative. It is for this reason that the single pivot suspension systems of the prior art have always had the swingarm pivotally attached to the frame at a point closely adjacent to the bottom bracket.

Finally, the rightmost curve 58 represents the wheelpath that would be travelled by the rear wheel's axle in the prior art Kramer-Massow patent which is discussed previously As is clear from this curve, the bicycle employing the structure disclosed therein imparts a tremendous amount of chain length growth to the bicycle during compression of the suspension system. As a result, without further modifications, it is possible that the bicycle would be restricted in its operation to small amounts of vertical travel of its rear wheel.

Figure 6:
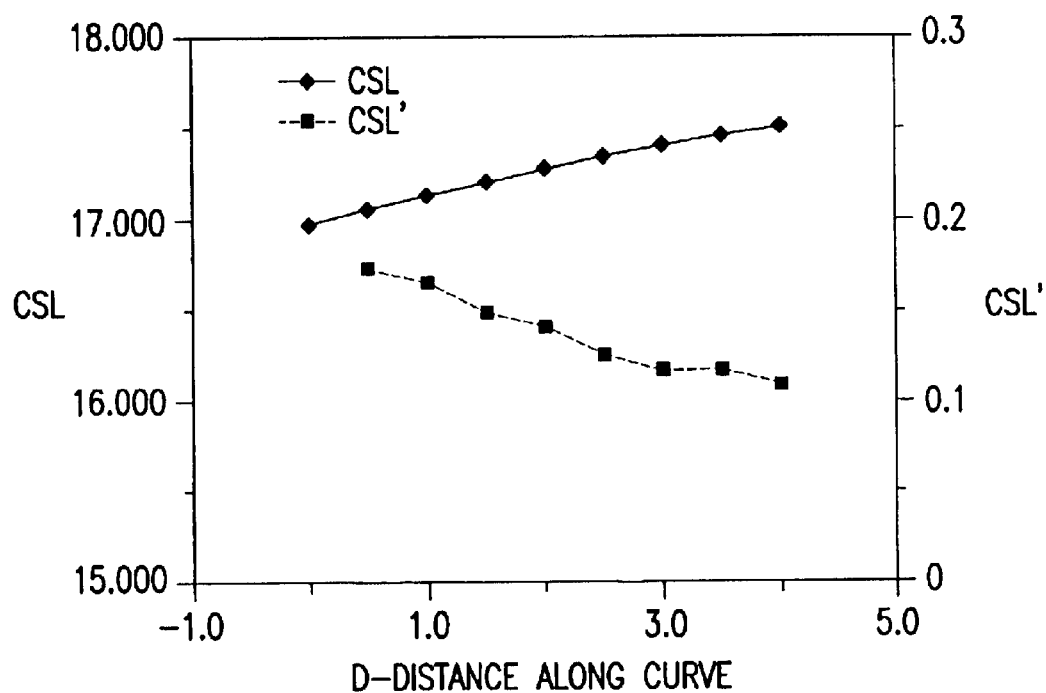
FIG. 6 is a graphical representation showing (1) the change in the distance between the rear wheel's axle and the bottom bracket of the bicycle's frame and (2) the rate of change of the distance between the rear wheel's axle and the bottom bracket, both as a function of the position of the rear wheel's axle along the wheelpath for the rear wheel suspension system shown in FIG. 1.

FIG. 6 is a graph which demonstrates certain of the important features of the present invention as they are found with respect to this first embodiment. That is, for the suspension system of the present invention to achieve its performance objectives, it is necessary for the chain length to increase continuously throughout the travel of the rear wheel's axle along the wheelpath. Also, it is necessary for the rate of change of that chain length to either remain essentially constant or change continuously in only a single sense over the movement of the rear wheel's axle upwardly from its lowermost position along the wheelpath. In FIG. 6, it can be seen that, with respect to the first embodiment of the invention that is shown in FIGS. 1–5, the chain length ("CSL") increases continuously over the full range of the wheelpath while the rate of change of CSL ("CSL'") decreases continuously over the length of the wheelpath.

Finally, with respect to this embodiment, it should be noted that the lower link members 28 are located well above the chain, and therefore eliminate all possibility of the chain being caught between a chainstay and a gear chainring, therefore preventing the problem of chainsuck which can occur over rough terrain with bikes having a low rear suspension link member.

Figure 7:
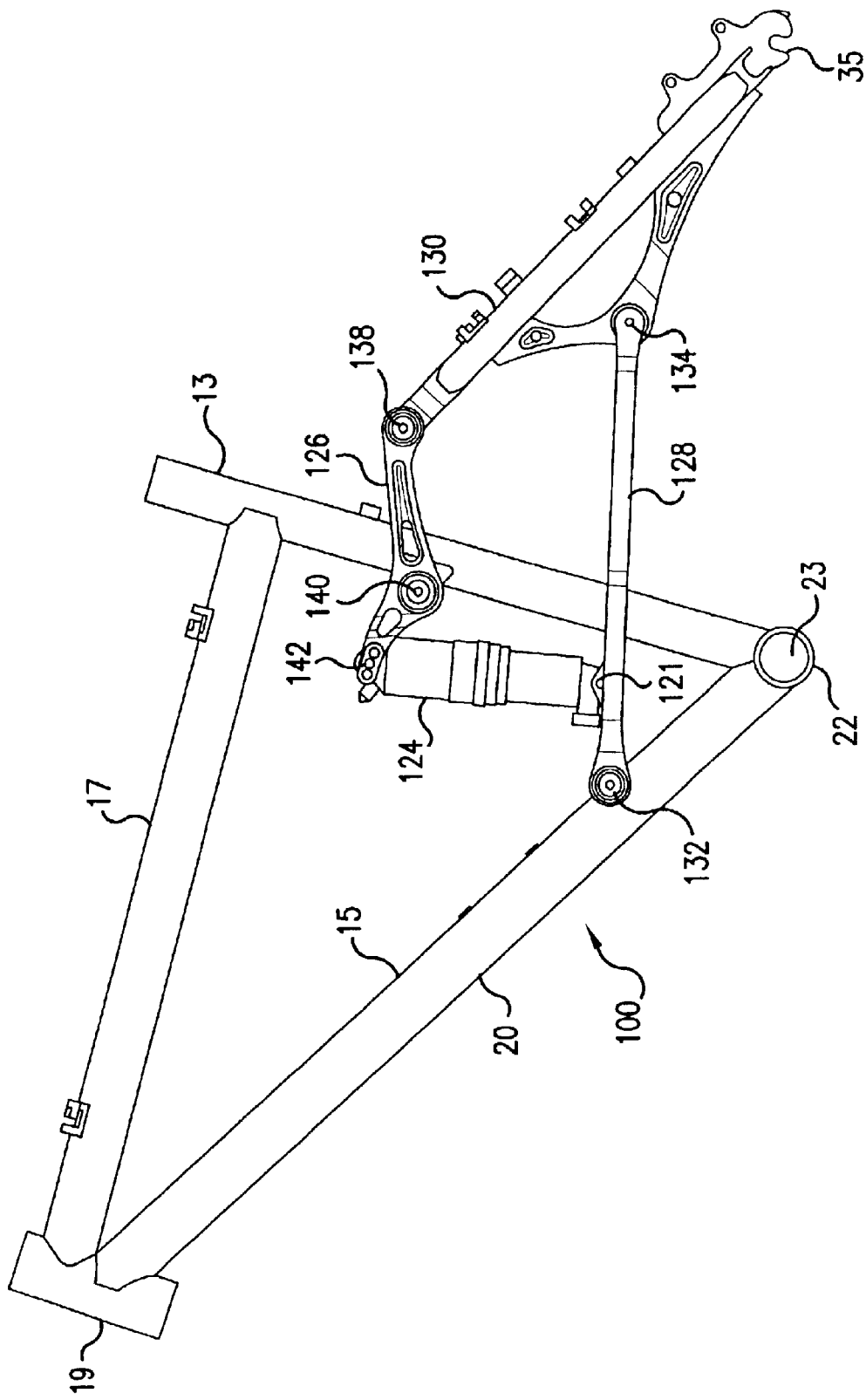
FIG. 7 is a side elevation view of a second embodiment of a rear suspension system according to the present invention, shown in its operational relationship with a bicycle frame, the suspension system being shown in its fully extended position.

Turning next to a second preferred embodiment of the present invention, FIG. 7 shows a side view of a bicycle frame generally at 100, in which a shock absorber 124 is mounted between a lower member 128 and the upper link member 126. In this embodiment, the upper link member 126 is, similarly to the upper link member 26 in FIG. 1, pivotally connected to the upper end of a rear stay member 130 at an upper rear pivot point 138 and to an upper front pivot point 140 with the seat tube 13, such that its effective length is quite similar to that of the upper link member 26 in the embodiment of FIG. 1. At the front of the upper link member 126, the upper link member 126 is pivotally connected to the upper end of the shock absorber 124. Again, the connection between the upper link member 126 and the shock absorber includes the previously described means for adjusting the length of the wheelpath along which the rear wheel's axle is permitted to travel.

There are two primary differences that occur in this embodiment. First, the lower link member 128 is pivotally connected to the main frame's down tube 15 at the lower front pivot point 132. The rear of the lower link member is again pivotally connected to a midpoint of the rear stay member 130 at a lower rear pivot point 134. As a result, the effective length of the lower link member 128, i.e., the length between the pivot points 132 and 134, is considerably longer than the effective length of the lower link member 28 in the embodiment shown in FIG. 1. Second, the lower end of the shock absorber 124 is pivotally affixed to an intermediate point 121 on the lower link member 128. Once again, each of pivot points 132 and 134 to which the lower link member 128 is connected are disposed above the tension run of the bicycle's chain as it runs between the chainrings and the rear sprockets.

Figure 8:
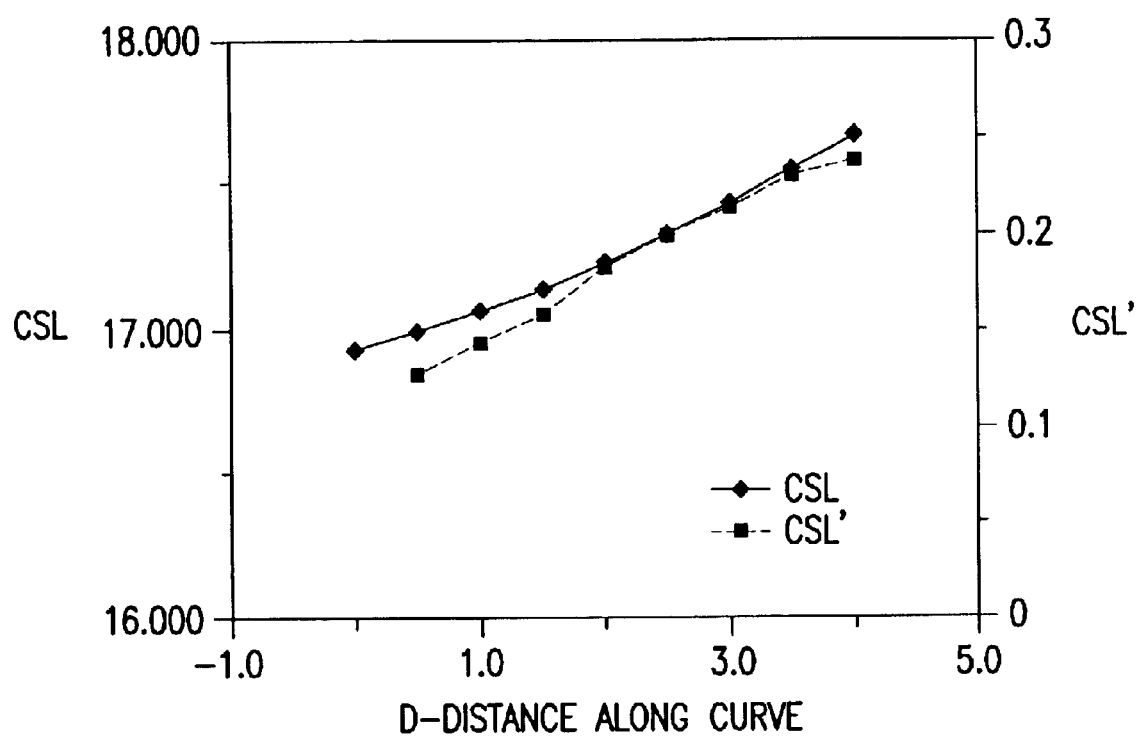
FIG. 8 is a graphical representation of the parameters shown in FIG. 6, but for the embodiment shown in FIG. 7.

FIG. 8 is a graphical demonstration of the CSL and CSL' properties of the second embodiment of the invention as is shown in FIG. 7. As can be seen, the CSL for this embodiment increases continually over the entire length of the wheelpath traveled by the rear wheel's axle, and the CSL' increases continuously over the length of that same wheelpath.

Figure 9:
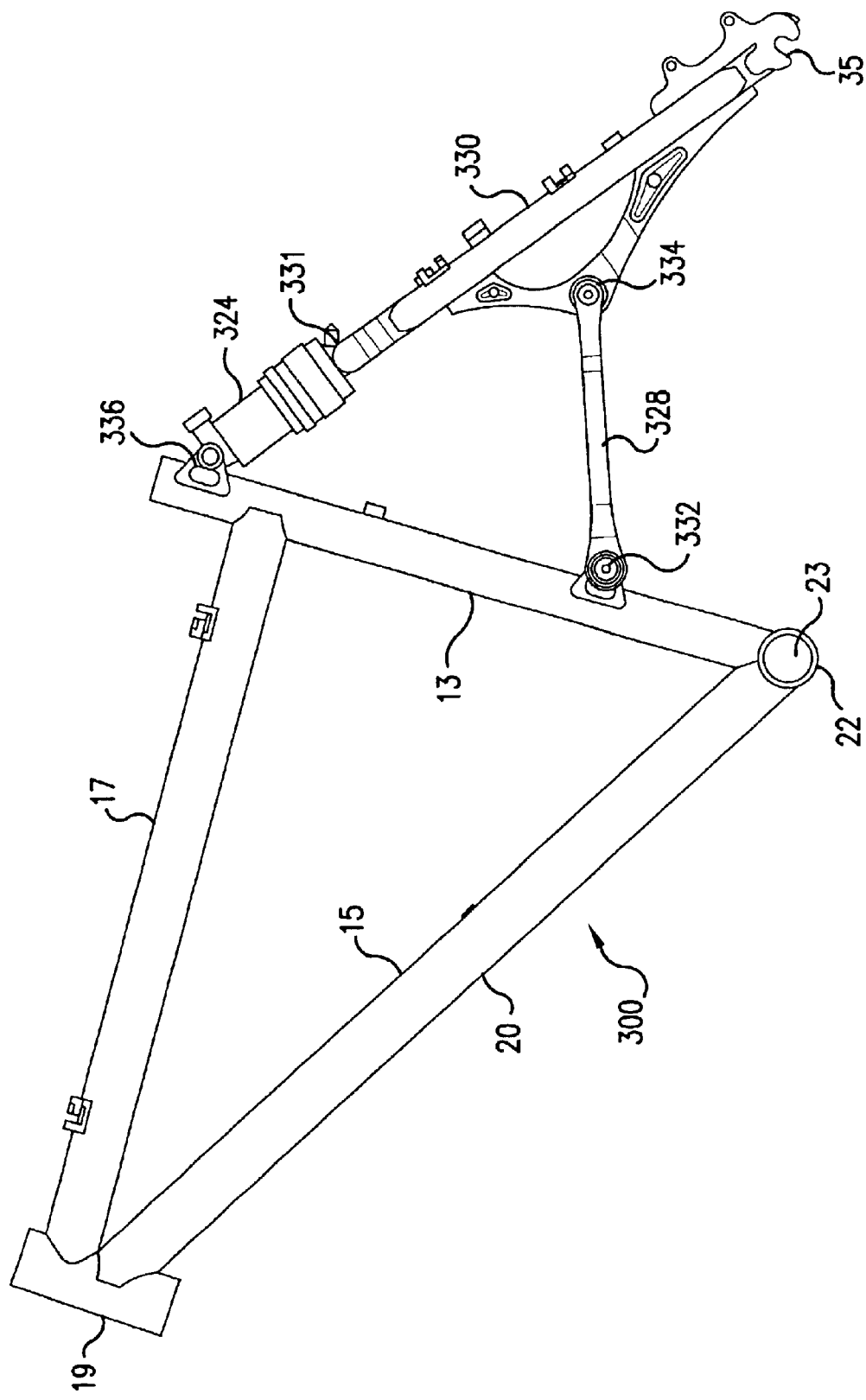
FIG. 9 is a side elevation view of a third embodiment of a rear suspension system according to the present invention, shown in its operational relationship with a bicycle frame, the suspension system being shown in its fully extended position.

FIG. 9 is a diagrammatic representation of a third embodiment of the present invention. In this embodiment, the bicycle frame in indicated generally by the reference numeral 300. Here, the shock absorber 324 is mounted rigidly at its lower end to the top 331 of the rear stay member 330 and pivotally connected at its upper end to a bracket 336 which is affixed to the seat tube 13 near its top. Once again, the lower link member 328 is pivotally connected at its rearmost end to a lower rear pivot point 334 which is intermediately located on the rear stay member 330. The front of the lower link member is pivotally connected at a lower front pivot point to the seat tube 13 at a location above the bottom bracket 22 and above the path of the bicycle's chain. Differently from each of the aforedescribed embodiments of the present invention, no upper link member is included. Instead, by placing the shock absorber 324 atop the rear stay member 330, a structure is achieved in which, because the effective length of the rear stay member has become variable over the length of the rear wheel's axle's wheelpath, the basic principles of the present invention, that is, where the wheelpath is generally vertical, the CSL increase continuously over the length of the wheelpath, and the rate of change of the CSL is either constant or changing in only a single sense is retained.

Figure 10:
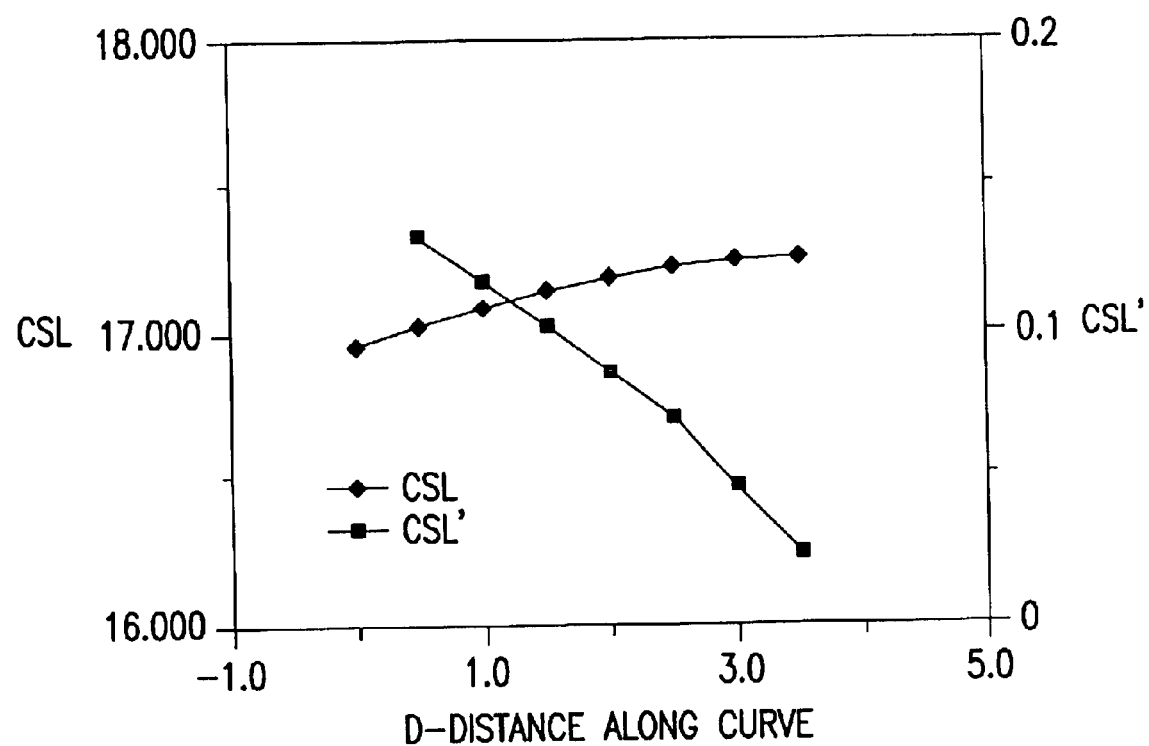
FIG. 10 is a graphical representation of the parameters shown in FIG. 6, but for the embodiment shown in FIG. 9.

FIG. 10 is a graphical demonstration of the CSL and CSL' properties of the third embodiment of the invention as is shown in FIG. 9. As can be seen, the CSL for this embodiment increases continually over the entire length of the wheelpath travelled by the rear wheel's axle, and the CSL' decreases continuously over the length of that same wheelpath.

Figure 11:
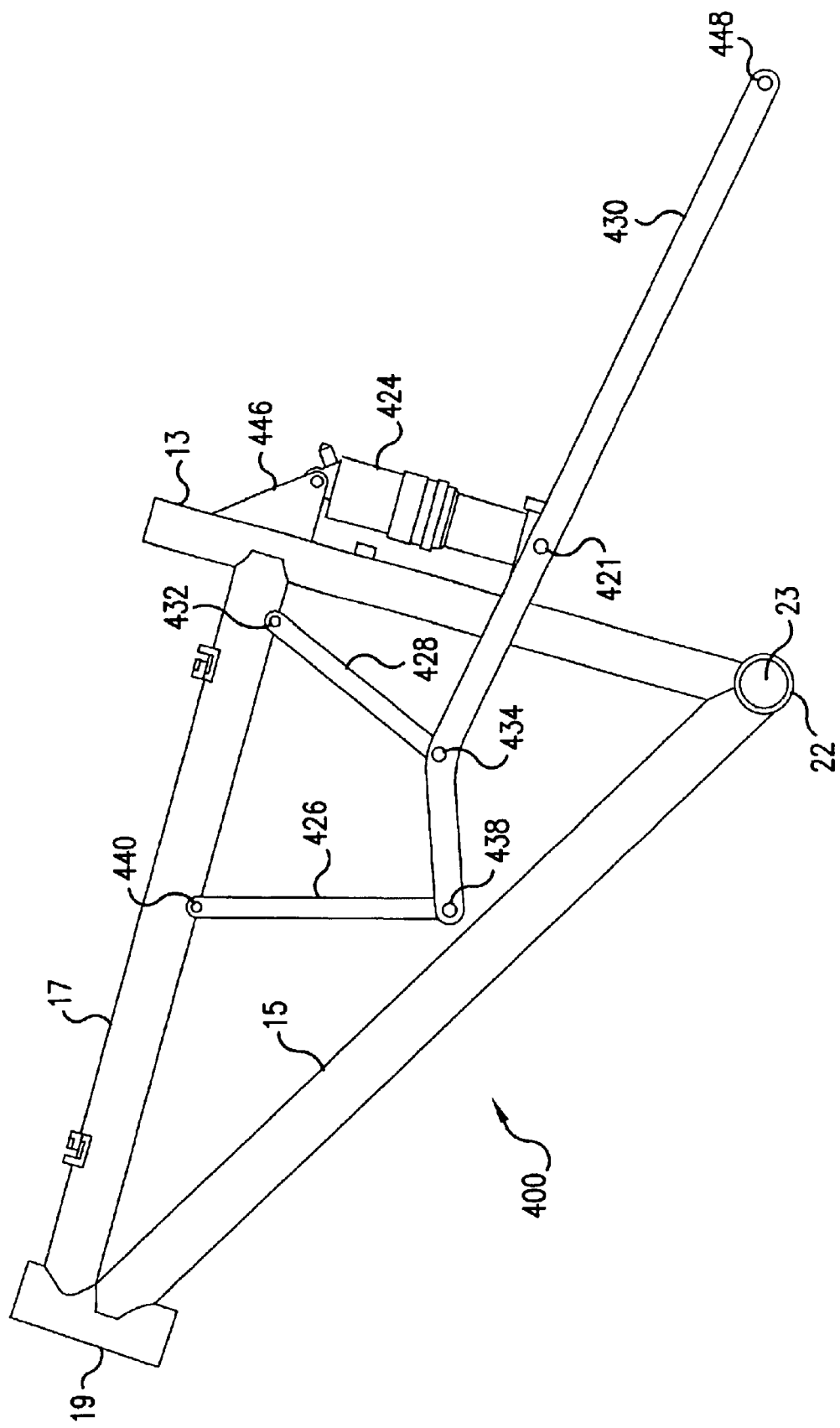
FIG. 11 is a side elevation view of a fourth embodiment of a rear suspension system according to the present invention, shown in its operational relationship with a bicycle frame, the suspension system being shown in its fully extended position.

Turning next to FIG. 11, there is shown a diagrammatic representation of a fourth embodiment of the present invention represented generally by the reference numeral 400. In this embodiment, the shock absorber 424 is pivotally connected at its upper end to a bracket 446 which is affixed to the seat tube 13. The bottom of the shock absorber 424 is pivotally connected to the rear stay member 430 at shock pivot point 421, which point is spaced from the lower end 448 of the rear stay member 430. The bicycle's rear wheel is rotatably attached to the lower end 448 of the rear stay member 430. The forward portion of the rear stay member 430 is pivotally connected to both of the upper and lower link members 426 and 428, respectively. Here, however, differently from the previous embodiments, the pivot points 434 and 438 to which the lower and upper link members 428 and 426, respectively, are pivotally connected to the rear stay member 430 are horizontally displaced from each other. Of course, if the tope tube 17 were to be disposed horizontally, it is well might be, or if the brackets which form the pivot points 434 and 438, were to be affixed to the top tube 17 appropriately, the pivot points 434 and 438 would then be displaced from each other only horizontally. Such an arrangement is also within the purview of the present invention. Also, the pivot points 432 and 440, at which the lower and upper lin members 428 and 426, respectively, are attached to the main frame 20, are on the top tube 17, rather than on the seat tube 13 or the down tube 15 as has been the case in the earlier embodiments. However, once again, the basic principles of the present invention, that is, where the wheelpath is generally vertical, the CSL increase continuously over the length of the wheelpath, and the rate of change of the CSL is either constant or changing in only a single sense are retained.

Figure 12:
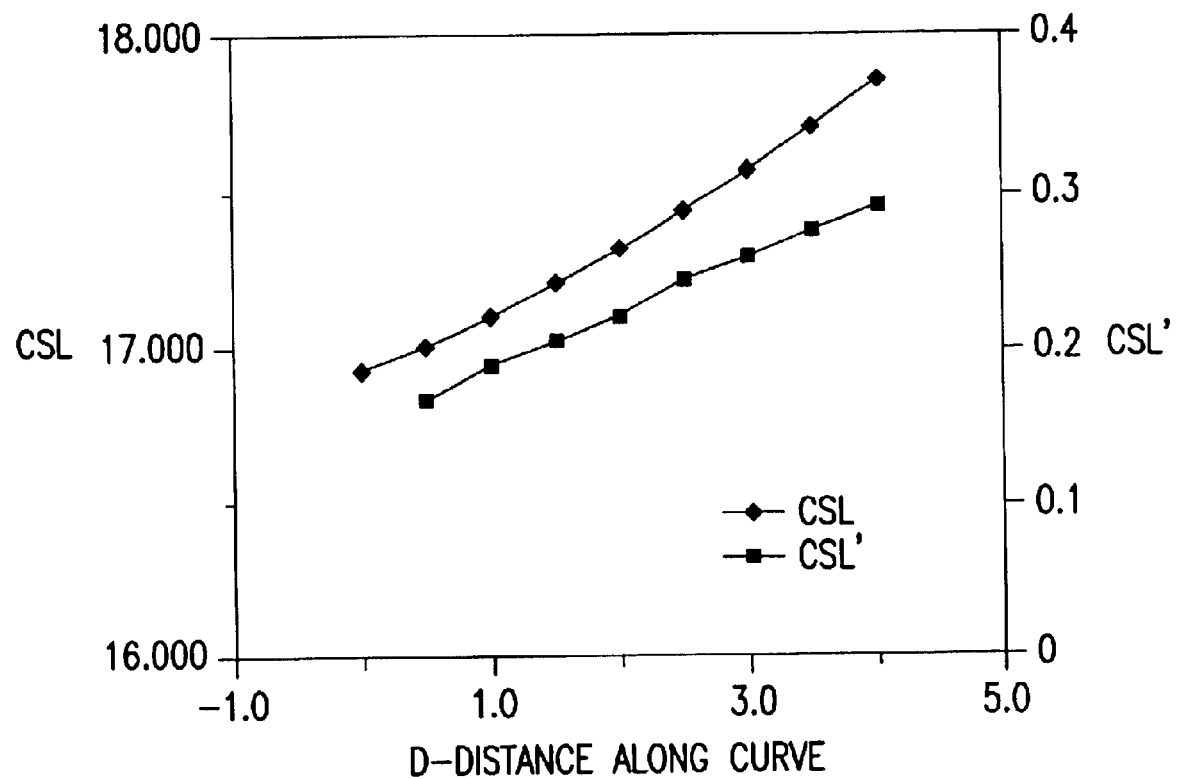
FIG. 12 is a graphical representation of the parameters shown in FIG. 6, but for the embodiment shown in FIG. 11.

FIG. 12 is a graphical demonstration of the CSL and CSL' properties of the fourth embodiment of the invention as is shown in FIG. 11. As can be seen, the CSL for this embodiment increases continually over the entire length of the wheelpath travelled by the rear wheel's axle, and the CSL' also increases continuously over the length of that same wheelpath.

Figure 13:
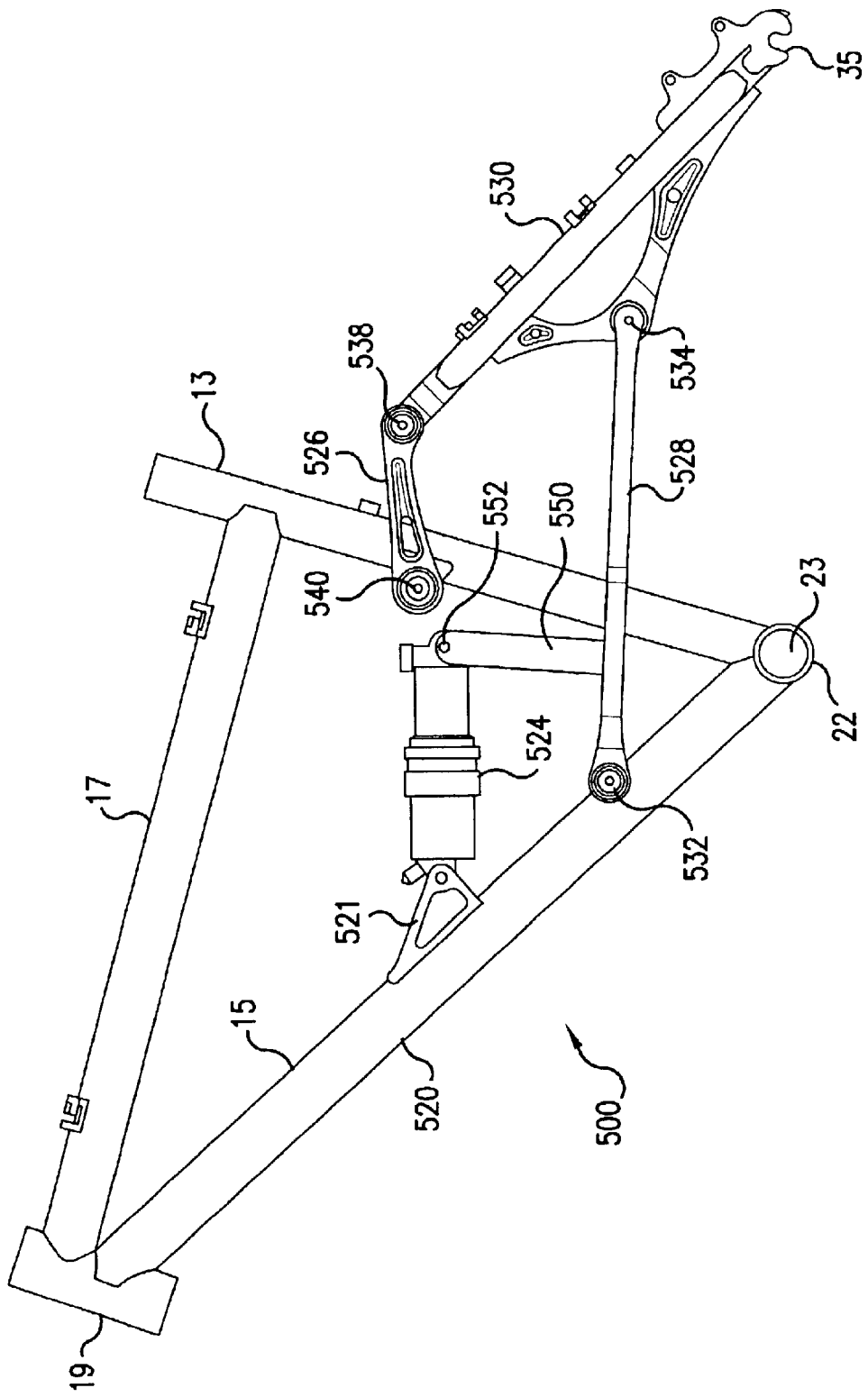
FIG. 13 is a side elevation view of a fifth embodiment of a rear suspension system according to the present invention, shown in its operational relationship with a bicycle frame, the suspension system being shown in its fully extended position.

Finally, reference is made to FIG. 13 in which is shown a fifth illustrative embodiment of the present invention, which embodiment is indicated generally by the reference numeral 500. In this embodiment, the upper link member 526 is pivotally connected to both the seat tube 13 and the rear stay member 530 at upper front and rear pivot points 540 and 538, respectively. The lower link member 528, which is considerably longer than the upper link member 526, is pivotally connected to both the down tube 15 and the rear stay member 530 at lower front and rear pivot points 532 and 534, respectively. Again in this embodiment, each of the link members and all of their pivot point connections to the frame 520 and the rear stay member 530 are above the tension line of the chain.

In this embodiment, the shock absorber 524 is mounted generally horizontally. At its forward end, the base of the shock absorber 524 is pivotally mounted to a bracket 521 that is affixed to the down tube 15 of the frame 520. The opposite end of the shock absorber 524 is pivotally connected at a shock pivot point 552 to a generally vertically extending arm 550 that extends from the main portion of the lower link member 528. Hence, the basic principles of the present invention, that is, the wheelpath being generally vertical, the CSL increasing continuously over the length of the wheelpath, and the rate of change of the CSL being either constant or changing in only a single sense are retained.

Figure 14:
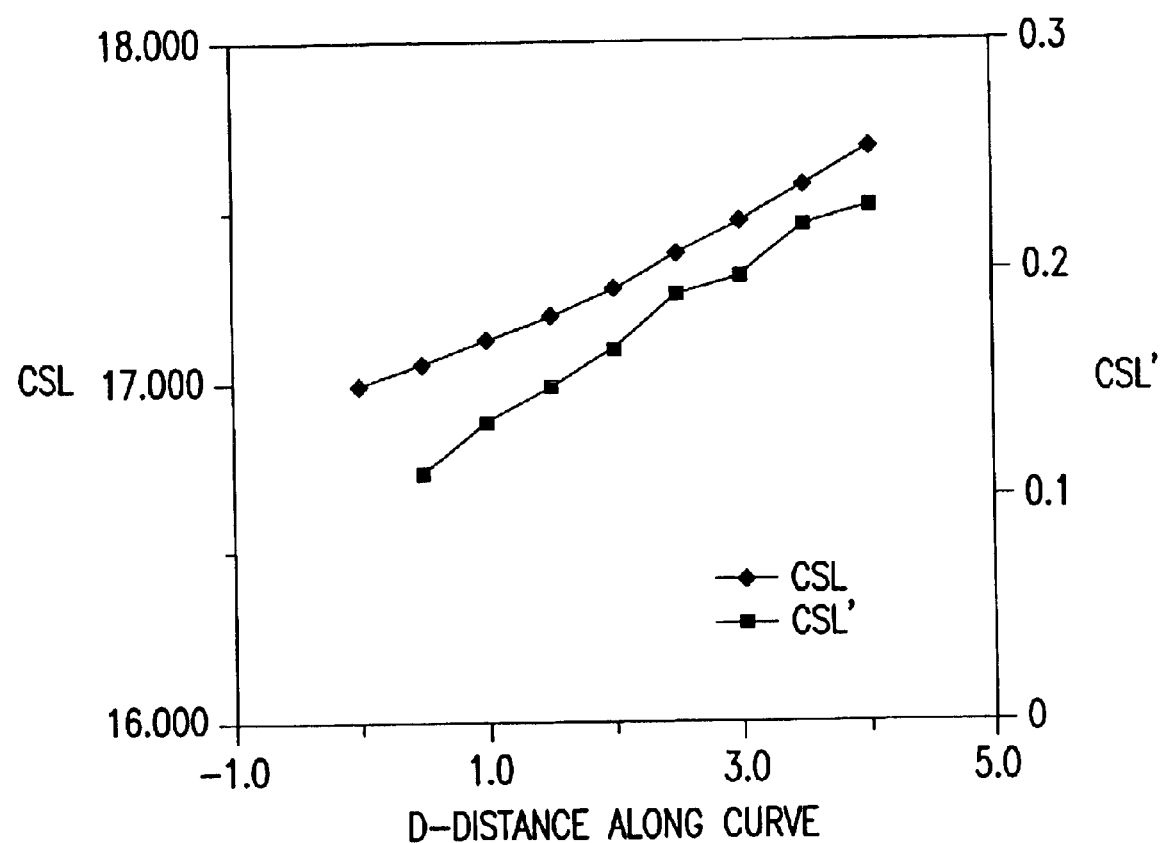
FIG. 14 is a graphical representation of the parameters shown in FIG. 6, but for the embodiment shown in FIG. 13.

FIG. 14 is a graphical demonstration of the CSL and CSL' properties of the fifth embodiment of the invention as is shown in FIG. 13. As can be seen, the CSL for this embodiment increases continually over the entire length of the wheelpath travelled by the rear wheel's axle, and the CSL' also increases continuously over the length of that same wheelpath.

The aforedescribed embodiments of the invention are intended to be exemplary only inasmuch as persons of ordinary skill in this art will appreciate that many changes can be made in the structure of the vehicles according to the present invention without departing from the spirit of that invention. The scope of the invention is, therefore, intended to be limited solely by the scope of the appended claims.

I claim:

1. A rear wheel suspension system for a chain-driven two-wheeled vehicle having a frame having a bottom bracket, and a rear wheel which rotates about a rear wheel axle at a distance from the bottom bracket, the suspension system comprising:

a multiple member linkage assembly which is pivotally attached to the frame at two separated locations, the linkage assembly including a rear stay member and a lower linkage member, the rear stay member, at its lower end, supporting the rear wheel of the vehicle at its axle in a manner such that the rear wheel is able to move generally vertically with its axle moving from a lowermost position upward along a generally vertical wheelpath, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle either remains essentially constant or changes continuously in only a single sense over the movement of the rear wheel's axle upwardly from its lowermost position along the wheelpath, and the lower linkage member being pivotally connected to the frame at one of said locations and pivotally connected rearwardly thereof to an intermediately located point on the rear stay member which is above the axle of the rear wheel when the rear wheel is in its lowermost position relative to the frame; and a shock absorbing and damping device affixed between a member of the linkage assembly and either the frame or another member of the linkage assembly to cause the rear wheel to maintain as continuous a contact as possible with a surface over which the vehicle is ridden despite the presence of irregularities in the surface.

2. A rear wheel suspension system according to claim 1, wherein the vehicle is a bicycle.

3. A rear wheel suspension system according to claim 2, wherein the bicycle is a mountain bicycle.

4. A rear wheel suspension system according to claim 1, wherein the increase in distance between the bottom bracket and the rear wheel's axle is limited to about 30 millimeters.

5. A rear wheel suspension system according to claim 4, wherein the increase in distance between the bottom bracket and the rear wheel's axle is limited to a distance ranging from about 9 millimeters to about 27 millimeters.

6. A rear wheel suspension system according to claim 1, wherein the multiple member linkage is a four-bar linkage.

7. A rear wheel suspension system according to claim 6, wherein the four-bar linkage includes an upper linkage member which is pivotally connected between the second location on the frame and the rear stay member.

8. A rear wheel suspension system according to claim 7, wherein the upper linkage member is pivotally connected to the rear stay member at a point which is above the intermediately located point of connection of the lower linkage member to the rear stay member.

9. A rear wheel suspension system according to claim 7, wherein the two separated locations on the frame are vertically displaced from each other with the lower linkage member being pivotally connected to the frame at the lower of the two locations.

10. A rear wheel suspension system according to claim 1, wherein each of the aforementioned members of the multiple member linkage is disposed on one side of the rear wheel and an opposed, corresponding member to each of the aforementioned multiple members of the linkage is disposed on the opposite side of the rear wheel.

11. A rear wheel suspension system according to claim 10, wherein each member of the multiple member linkage is attached to the opposed, corresponding member of the other set.

12. A rear wheel suspension system according to claim 1, wherein there is further included a means for adjusting the distance that the rear wheel's axle is able to travel upwardly along the generally vertical wheelpath from its lowermost position.

13. A rear wheel suspension system according to claim 1, wherein the shock absorbing and damping device is affixed between the frame and a member of the multiple member linkage assembly.

14. A rear wheel suspension system according to claim 13, wherein the multiple member linkage is a four-bar linkage.

15. A rear wheel suspension system according to claim 14, wherein shock absorbing and damping device is affixed between the frame and the upper linkage member.

16. A rear wheel suspension system according to claim 1, wherein the rate of change of distance between the bottom bracket and the rear wheel's axle increases continuously over the movement of the rear wheel's axle upwardly from its lowermost position along the wheelpath.

17. A rear wheel suspension system according to claim 16, wherein the location of the initial instantaneous center of rotation, when the rear wheel's axle is at its lowermost position, is above the location of the final instantaneous center of rotation, when the rear wheel's axle is at its uppermost position.

18. A rear wheel suspension system according to claim 1, wherein the generally vertical wheelpath has, at all locations therealong, an instantaneous center of rotation, which centers of rotation lie along a line which commences, when the rear wheel of the vehicle is at its lowermost position relative to the frame, forward of the bottom bracket and which moves, as the rear wheel moves generally vertically, continuously rearwardly.

19. A rear wheel suspension system according to claim 18, wherein the line of instantaneous centers of rotation commences, when the rear wheel of the vehicle is at its lowermost position, at a point that is higher than at the opposite end of the line, when the rear wheel's axle is at its uppermost position.

20. A rear wheel suspension system for a bicycle having a frame having a bottom bracket, and a rear wheel which rotates about a rear wheel axle at a distance from the bottom bracket, the suspension system comprising:

a multiple member linkage assembly which is pivotally attached to the frame at two separated locations, the linkage assembly including a rear stay member and a lower linkage member, the rear stay member, at its lower end, supporting the rear wheel of the bicycle at its axle in a manner such that the rear wheel is able to move generally vertically with its axle moving from a lowermost position upward along a generally vertical wheelpath that has, at all locations therealong, an instantaneous center of rotation, which instantaneous centers of rotation lie along a line which commences, when the rear wheel of the bicycle is at its lowermost position relative to the frame, forward of the bottom bracket and which moves, as the rear wheel moves generally vertically, continuously rearwardly, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle either remains essentially constant or changes continuously in only a single sense over the movement of the rear wheel's axle upwardly from its lowermost position along the wheelpath, and the lower linkage member being pivotally connected to the frame at one of said locations and pivotally connected rearwardly thereof to an intermediately located point on the rear stay member which is above the axle of the rear wheel when the rear wheel is in its lowermost position relative to the frame; and a shock absorbing and damping device affixed between a member of the linkage assembly and either the frame or another member of the linkage assembly to cause the rear wheel to maintain as continuous a contact as possible with a surface over which the bicycle is ridden despite the presence of irregularities in the surface.

21. A rear wheel suspension system for a bicycle according to claim 20, wherein the bicycle is a mountain bicycle.

22. A rear wheel suspension system for a bicycle according to claim 21, wherein the increase in distance between the bottom bracket and the rear wheel's axle is limited to about 30 millimeters.

23. A rear wheel suspension system for a bicycle according to claim 22, wherein the increase in distance between the bottom bracket and the rear wheel's axle is limited to a distance ranging from about 9 millimeters to about 27 millimeters.

24. A rear wheel suspension system for a bicycle according to claim 20, wherein the multiple member linkage is a four-bar linkage.

25. A rear wheel suspension system for a bicycle according to claim 24, wherein the four-bar linkage includes an upper linkage member which is pivotally connected between the second location on the frame and the rear stay member.

26. A rear wheel suspension system for a bicycle according to claim 25, wherein the upper linkage member is pivotally connected to the rear stay member at a point which is above the intermediately located point of connection of the lower linkage member to the rear stay member.

27. A rear wheel suspension system for a bicycle according to claim 25, wherein the two separated locations on the frame are vertically displaced from each other with the lower linkage member being pivotally connected to the frame at the lower of the two locations.

28. A rear wheel suspension system according to claim 20, wherein each of the aforementioned members of the multiple member linkage is disposed on one side of the rear wheel and an opposed, corresponding member to each of the aforementioned multiple members of the linkage is disposed on the opposite side of the rear wheel.

29. A rear wheel suspension system according to claim 28, wherein each member of the multiple member linkage is attached to the opposed, corresponding member of the other set.

30. A rear wheel suspension system for a bicycle according to claim 20, wherein there is further included a means for adjusting the distance that the rear wheel's axle is able to travel upwardly along the generally vertical wheelpath from its lowermost position.

31. A rear wheel suspension system for a bicycle according to claim 20, wherein the shock absorbing and damping device is affixed between the frame and a member of the multiple member linkage assembly.

32. A rear wheel suspension system for a bicycle according to claim 31, wherein the multiple member linkage is a four-bar linkage.

33. A rear wheel suspension system for a bicycle according to claim 32, wherein shock absorbing and damping device is affixed between the frame and the upper linkage member.

34. A rear wheel suspension system for a bicycle according to claim 20, wherein the rate of change of distance between the bottom bracket and the rear wheel's axle increases continuously over the movement of the rear wheel's axle upwardly from its lowermost position along the wheelpath.

35. A rear wheel suspension system for a bicycle according to claim 34, wherein the location of the initial instantaneous center of rotation, when the rear wheel's axle is at its lowermost position, is above the location of the final instantaneous center of rotation, when the rear wheel's axle is at its uppermost position.

36. A rear wheel suspension system for a bicycle according to claim 20, wherein the line of instantaneous centers of rotation commences, when the rear wheel of the vehicle is at its lowermost position, at a point that is higher than at the opposite end of the line, when the rear wheel's axle is at its uppermost position.

37. A rear wheel suspension system for a bicycle having a frame having a bottom bracket, and a rear wheel which rotates about a rear wheel axle at a distance from the bottom bracket, the suspension system comprising:
a multiple member linkage assembly which is pivotally attached to the frame at two separated locations, both of which are spaced above the bottom bracket, the linkage assembly including a pair of rear stay members and a pair of lower linkage members, a respective one of each said pair being disposed on opposite sides of the rear wheel, the rear stay members, at their lower ends, supporting the rear wheel of the bicycle at its axle in a manner such that the rear wheel is able to move generally vertically with its axle moving from a lowermost position upward along a generally vertical wheelpath, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle either remains essentially constant or changes continuously in only a single sense over the movement of the rear wheel's axle upwardly from its lowermost position along the wheelpath, and each of the lower linkage members being pivotally connected to the frame at one of said locations and pivotally connected rearwardly thereof to an intermediately located point on the respective rear stay member which point is above the axle of the rear wheel when the rear wheel is in its lowermost position relative to the frame; and
a shock absorbing and damping device affixed between a member of the linkage assembly and either the frame or another member of the linkage assembly to cause the rear wheel to maintain as continuous a contact as possible with a surface over which the bicycle is ridden despite the presence of irregularities in the surface.

38. A rear wheel suspension system for a bicycle according to claim 37, wherein the bicycle is a mountain bicycle.

39. A rear wheel suspension system for a bicycle according to claim 38, wherein the increase in distance between the bottom bracket and the rear wheel's axle is limited to about 30 millimeters.

40. A rear wheel suspension system for a bicycle according to claim 39, wherein the increase in distance between the bottom bracket and the rear wheel's axle is limited to a distance ranging from about 9 millimeters to about 27 millimeters.

41. A rear wheel suspension system for a bicycle according to claim 37, wherein the multiple member linkage is a four-bar linkage.

42. A rear wheel suspension system for a bicycle according to claim 41, wherein the four-bar linkage includes an upper linkage member which is pivotally connected between the second location on the frame and the rear stay member.

43. A rear wheel suspension system for a bicycle according to claim 42, wherein the upper linkage member is pivotally connected to the rear stay member at a point which is above the intermediately located point of connection of the lower linkage member to the rear stay member.

44. A rear wheel suspension system for a bicycle according to claim 42, wherein the two separated locations on the frame are vertically displaced from each other with the lower linkage member being pivotally connected to the frame at the lower of the two locations.

45. A rear wheel suspension system according to claim 37, wherein each member of each set of opposed, corresponding members of the multiple member linkage is attached to the opposed, corresponding member of the other set.

46. A rear wheel suspension system for a bicycle according to claim 37, wherein there is further included a means for adjusting the distance that the rear wheel's axle is able to travel upwardly along the generally vertical wheelpath from its lowermost position.

47. A rear wheel suspension system for a bicycle according to claim 46, wherein the means for adjusting the distance that the rear wheel's axle is able to travel upwardly along the generally vertical wheelpath from its lowermost position includes at least three selectable positions, each of which limits the length of the wheelpath over which the rear wheel's axle may travel to a different length.

48. A rear wheel suspension system for a bicycle according to claim 47, wherein the means for adjusting the distance that the rear wheel's axle is able to travel upwardly along the generally vertical wheelpath from its lowermost position includes having the shock absorbing and damping device being pivotally connected between the frame and a forward portion of the upper linkage member, and the connection between the shock absorbing and damping device being adjustable to any one of the at least three selectable positions.

49. A rear wheel suspension system for a bicycle according to claim 48, wherein the shock absorbing and damping device is pivotally connected to the upper linkage member by a means that permits a rapid change between the selectable positions.

50. A rear wheel suspension system for a bicycle according to claim 49, wherein the means for adjusting the distance that the rear wheel's axle is able to travel upwardly along the generally vertical wheelpath from its lowermost position includes a series of holes being located in the forward portion of the upper linkage member.

51. A rear wheel suspension system for a bicycle according to claim 46, wherein the means for adjusting the distance that the rear wheel's axle is able to travel upwardly along the generally vertical wheelpath from its lowermost position includes means for providing a continuously adjustable length of the wheelpath.

52. A rear wheel suspension system for a bicycle according to claim 37, wherein the shock absorbing and damping device is affixed between the frame and a member of the multiple member linkage assembly.

53. A rear wheel suspension system for a bicycle according to claim 52, wherein the multiple member linkage is a four-bar linkage.

54. A rear wheel suspension system for a bicycle according to claim 53, wherein the shock absorbing and damping device is affixed between the frame and the upper linkage member.

55. A rear wheel suspension system for a bicycle according to claim 37, wherein the rate of change of distance between the bottom bracket and the rear wheel's axle decreases continuously over the movement of the rear wheel's axle upwardly from its lowermost position along the wheelpath.

56. A rear wheel suspension system for a bicycle according to claim 55, wherein the location of the initial instantaneous center of rotation, when the rear wheel's axle is at its lowermost position, is above the location of the final instantaneous center of rotation, when the rear wheel's axle is at its uppermost position.

57. A rear wheel suspension system for a bicycle having a frame having a bottom bracket, and a rear wheel which rotates about a rear wheel axle at a distance from the bottom bracket, the suspension system comprising:

a four-bar linkage assembly which is pivotally attached to the frame at two vertically separated locations, the lower one of which is vertically spaced above the bottom bracket, the linkage assembly including a pair of rear stay members and a pair of lower linkage members, a respective one of each said pair being disposed on opposite sides of the rear wheel, the rear stay members, at their lower ends, supporting the rear wheel of the bicycle at its axle in a manner such that the rear wheel is able to move generally vertically with its axle moving from a lowermost position upward along a generally vertical wheelpath that has, at all locations therealong, an instantaneous center of rotation, which centers of rotation lie along a line which commences, when the rear wheel of the bicycle is at its lowermost position relative to the frame, forward of the bottom bracket and which moves, as the rear wheel moves generally vertically, continuously rearwardly, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle decreases continuously over the movement of the rear wheel's axle upwardly from its lowermost position along the wheelpath, and the lower linkage member being pivotally connected to the frame at one of said locations and pivotally connected rearwardly thereof to an intermediately located point on the rear stay member which is above the axle of the rear wheel when the rear wheel is in its lowermost position relative to the frame; and a shock absorbing and damping device affixed between a member of the linkage assembly and either the frame or another member of the linkage assembly to cause the rear wheel to maintain as continuous a contact as possible with a surface over which the bicycle is ridden despite the presence of irregularities in the surface.

58. A rear wheel suspension system for a bicycle according to claim 57, wherein the bicycle is a mountain bicycle.

59. A rear wheel suspension system for a bicycle according to claim 58, wherein the increase in distance between the bottom bracket and the rear wheel's axle is limited to about 30 millimeters.

60. A rear wheel suspension system for a bicycle according to claim 59, wherein the increase in distance between the bottom bracket and the rear wheel's axle is limited to a distance ranging from about 9 millimeters to about 27 millimeters.

61. A rear wheel suspension system for a bicycle according to claim 57, wherein the four-bar linkage includes an upper linkage member which is pivotally connected between the second location on the frame and the rear stay member.

62. A rear wheel suspension system for a bicycle according to claim 61, wherein the upper linkage member is pivotally connected to the rear stay member at a point which is above the intermediately located point of connection of the lower linkage member to the rear stay member.

63. A rear wheel suspension system for a bicycle according to claim 62, wherein the two separated locations on the frame are vertically displaced from each other with the lower linkage member being pivotally connected to the frame at the lower of the two locations.

64. A rear wheel suspension system according to claim 57, wherein each member of each set of opposed, corresponding members of the multiple member linkage is attached to the opposed, corresponding member of the other set.

65. A rear wheel suspension system for a bicycle according to claim 57, wherein there is further included a means for adjusting the distance that the rear wheel's axle is able to travel upwardly along the generally vertical wheelpath from its lowermost position.

66. A rear wheel suspension system for a bicycle according to claim 65, wherein the means for adjusting the distance that the rear wheel's axle is able to travel upwardly along the generally vertical wheelpath from its lowermost position includes at least three selectable positions, each of which limits the length of the wheelpath over which the rear wheel's axle may travel to a different length.

67. A rear wheel suspension system for a bicycle according to claim 66, wherein the means for adjusting the distance that the rear wheel's axle is able to travel upwardly along the generally vertical wheelpath from its lowermost position includes having the shock absorbing and damping device being pivotally connected between the frame and a forward portion of the upper linkage member, and the connection between the shock absorbing and damping device being adjustable to any one of the at least three selectable positions.

68. A rear wheel suspension system for a bicycle according to claim 67, wherein the shock absorbing and damping device is pivotally connected to the upper linkage member by a means that permits a rapid change between the selectable positions.

69. A rear wheel suspension system for a bicycle according to claim 68, wherein the means for adjusting the distance that the rear wheel's axle is able to travel upwardly along the generally vertical wheelpath from its lowermost position includes a series of holes being located in the forward portion of the upper linkage member.

70. A rear wheel suspension system for a bicycle according to claim 65, wherein the means for adjusting the distance that the rear wheel's axle is able to travel upwardly along the generally vertical wheelpath from its lowermost position includes means for providing a continuously adjustable length of the wheelpath.

71. A rear wheel suspension system for a bicycle according to claim 57, wherein the shock absorbing and damping device is affixed between the frame and a member of the four-bar linkage assembly.

72. A rear wheel suspension system for a bicycle according to claim 71, wherein the shock absorbing and damping device is affixed between the frame and the upper linkage member.

73. A rear wheel suspension system for a bicycle according to claim 57, wherein the frame has a top tube, a down tube, and a seat tube, and wherein the pivotal connections between both of the lower and upper linkage members are at brackets which are attached to the frame on the seat tube.

74. A rear wheel suspension system for a bicycle according to claim 57, wherein the location of the initial instantaneous center of rotation, when the rear wheel's axle is at its lowermost position, is above the location of the final instantaneous center of rotation, when the rear wheel's axle is at its uppermost position.

75. A rear wheel suspension system for a bicycle having a frame having a bottom bracket, and a rear wheel which rotates about a rear wheel axle at a distance from the bottom bracket, the suspension system comprising:
  a four-bar linkage assembly which is pivotally attached to the frame at two vertically separated locations, the lower one of which is vertically spaced above the bottom bracket, the linkage assembly including a pair of rear stay members, a pair of lower linkage members, and a pair of upper linkage members, a respective one of each pair said of members being disposed on opposite sides of the rear wheel, the rear stay members, at their lower ends, supporting the rear wheel of the vehicle at its axle in a manner such that the rear wheel is able to move generally vertically with its axle moving from a lowermost position upward along a generally vertical wheelpath that has, at all locations therealong, an instantaneous center of rotation, which centers of rotation lie along a line which commences, when the rear wheel of the bicycle is at its lowermost position relative to the frame, forward of the bottom bracket and which moves, as the rear wheel moves generally vertically, continuously rearwardly, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle increases continuously over the movement of the rear wheel's axle upwardly from its lowermost position along the wheelpath, and the lower linkage member being pivotally connected to the frame at one of said locations and pivotally connected rearwardly thereof to an intermediately located point on the respective one of the rear stay members which is above the axle of the rear wheel when the rear wheel is in its lowermost position relative to the frame, and each of the upper linkage members being pivotally connected to the frame at the other of said locations and pivotally connected to the respective one of the rear stay members at a point which is spaced vertically above the pivotal connection of the lower linkage members to the respective rear stay members; and
  a shock absorbing and damping device affixed between a member of the four-bar linkage assembly and either the frame or another member of the linkage assembly to cause the rear wheel to maintain as continuous a contact as possible with a surface over which the bicycle is ridden despite the presence of irregularities in the surface.

76. A rear wheel suspension system for a bicycle according to claim 75, wherein the bicycle is a mountain bicycle.

77. A rear wheel suspension system for a bicycle according to claim 75, wherein the lower linkage member is pivotally connected to the frame at the lower of the two locations.

78. A rear wheel suspension system for a bicycle according to claim 75, wherein the shock absorbing and damping device is affixed between two members of the four-bar linkage assembly.

79. A rear wheel suspension system for a bicycle according to claim 78, wherein the shock absorbing and damping device is pivotally affixed between the lower linkage member and the upper linkage member.

80. A rear wheel suspension system for a bicycle according to claim 79, wherein the frame has a top tube, a down tube, and a seat tube, wherein the shock absorbing and damping device is pivotally connected to the lower linkage member at a pivot point which is intermediately located along the lower linkage member, and the pivotal connection between the lower linkage member and the frame is located on the down tube of the frame.

81. A rear wheel suspension system for a bicycle having a frame having a bottom bracket, and a rear wheel which rotates about a rear wheel axle at a distance from the bottom bracket, the suspension system comprising:
  a multiple member linkage assembly which is pivotally attached to the frame at two vertically separated locations, both of which are vertically spaced above the bottom bracket, the linkage assembly including a pair of rear stay members, and a pair of lower linkage members, a respective one of each pair of said members being disposed on opposite sides of the rear wheel, the rear stay members, at their lower ends, supporting the rear wheel of the vehicle at its axle in a manner such that the rear wheel is able to move generally vertically with its axle moving from a lowermost position upward along a generally vertical wheelpath that has, at all locations therealong, an instantaneous center of rotation, which centers of rotation lie along a line which commences, when the rear wheel of the bicycle is at its lowermost position relative to the frame, forward of the bottom bracket and which moves, as the rear wheel moves generally vertically, continuously rearwardly, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle decreases continuously over the movement of the rear wheel's axle upwardly from its lowermost position along the wheelpath, and the lower linkage member being pivotally connected to the frame at the lower one of said locations and pivotally connected rearwardly thereof to an intermediately located point on the respective one of the rear stay members which is above the axle of the rear wheel when the rear wheel is in its lowermost position relative to the frame; and
  a shock absorbing and damping device affixed rigidly to the upper ends of the rear stay members and pivotally connected at its other end to the frame to cause the rear wheel to maintain as continuous a contact as possible with a surface over which the bicycle is ridden despite the presence of irregularities in the surface.

82. A rear wheel suspension system for a bicycle according to claim 81, wherein the bicycle is a mountain bicycle.

83. A rear wheel suspension system for a bicycle according to claim 81, wherein the frame has a top tube, a down tube, and a seat tube, wherein the shock absorbing and damping device is pivotally connected to the frame adjacent the top of the seat tube.

84. A rear wheel suspension system for a bicycle having a frame having a bottom bracket, and a rear wheel which rotates about a rear wheel axle at a distance from the bottom bracket, the suspension system comprising:
  a four-bar linkage assembly which is pivotally attached to the frame at two horizontally separated locations, both of which are vertically spaced above the bottom bracket, the linkage assembly including a pair of rear stay members, a pair of lower linkage members, and a pair of upper linkage members, the pair of rear stay members, at their lower ends, supporting the rear wheel of the vehicle at its axle in a manner such that the rear wheel is able to move generally vertically with its axle moving from a lowermost position upward along a generally vertical wheelpath, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle either increases continuously over the movement of the rear wheel's axle upwardly from its lowermost position along the wheelpath, the lower linkage member being pivotally connected to the frame at the rearmost one of said locations, and extending downwardly therefrom to a pivotal connection at to an intermediately located point on the rear stay member which is above the axle of the rear wheel when the rear wheel is in its Lowermost position relative to the frame, and the upper linkage member being pivotally connected to the frame at the other of the locations, and extending downwardly therefrom to a pivotal connection with the rear stay members adjacent their upper end; and a shock absorbing and damping device being affixed between the frame and the rear stay members to cause the rear wheel to maintain as continuous a contact as possible with a surface over which the bicycle is ridden despite the presence of irregularities in the surface.

85. A rear wheel suspension system for a bicycle according to claim 84, wherein the bicycle is a mountain bicycle.

86. A rear wheel suspension system for a bicycle according to claim 84, wherein the frame has a top tube, a down tube, and a seat tube, and wherein one end of the shock absorbing and damping device is pivotally connected to a bracket which is affixed to the top of the seat tube.

87. A rear wheel suspension system for a bicycle according to claim 86, wherein both of the upper and lower linkage members are pivotally connected to the top tube of the frame, with the connection of the upper linkage member being forward of that of the lower linkage member.

88. A rear wheel suspension system for a bicycle having a frame having a bottom bracket, and a rear wheel which rotates about a rear wheel axle at a distance from the bottom bracket, the suspension system comprising:

a four-bar member linkage assembly which is pivotally attached to the frame at two vertically separated locations, the lower one of which is vertically spaced above the bottom bracket, the linkage assembly including a pair of rear stay members, a pair of lower linkage members, and a pair of upper linkage members, the pair of rear stay members, at their lower ends, supporting the rear wheel of the vehicle at its axle in a manner such that the rear wheel is able to move generally vertically with its axle moving from a lowermost position upward along a generally vertical wheelpath, such that the distance between the bottom bracket and the rear wheel's axle increases continuously as the rear wheel's axle is caused to move upwardly from its lowermost position along the wheelpath, and such that the rate of the change of distance between the bottom bracket and the rear wheel's axle either increases continuously over the movement of the rear wheel's axle upwardly from its lowermost position along the wheelpath, and the lower linkage member being pivotally connected to the frame at one of said locations and pivotally connected rearwardly thereof to an intermediately located point on the rear stay member which is above the axle of the rear wheel when the rear wheel is in its lowermost position relative to the frame; and a shock absorbing and damping device being pivotally connected between the lower linkage member and the frame to cause the rear wheel to maintain as continuous a contact as possible with a surface over which the bicycle is ridden despite the presence of irregularities in the surface.

89. A rear wheel suspension system for a bicycle according to claim 88, wherein the bicycle is a mountain bicycle.

90. A rear wheel suspension system for a bicycle according to claim 88, wherein the frame has a top tube, a down tube, and a seat tube, and wherein one end of the shock absorbing and damping device is pivotally connected to a bracket which is affixed to the down tube.

91. A rear wheel suspension system for a bicycle according to claim 90, wherein the other end of the shock absorbing and damping device is pivotally connected to a generally vertically extending arm of the lower linkage member, and wherein the pivotal connection of the lower linkage member to the frame is on the down tube.

* * * * *